(12) United States Patent
Furuya

(10) Patent No.: US 6,988,153 B2
(45) Date of Patent: Jan. 17, 2006

(54) DATA STORING SYSTEM AND TRANSMISSION CONTROL METHOD

(75) Inventor: Shinji Furuya, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 224 days.

(21) Appl. No.: 10/700,681

(22) Filed: Nov. 5, 2003

(65) Prior Publication Data

US 2004/0093442 A1    May 13, 2004

(30) Foreign Application Priority Data

Nov. 8, 2002  (JP) .............................. 2002-325385

(51) Int. Cl.
G06F 3/00   (2006.01)
G06F 3/06   (2006.01)
G06F 13/00  (2006.01)

(52) U.S. Cl. .............................. 710/57; 710/6; 710/53; 711/111; 711/112; 711/114

(58) Field of Classification Search .................. 710/5, 710/6, 7, 52, 53, 57; 711/4, 111, 112, 114, 711/154
See application file for complete search history.

(56) References Cited

U.S. PATENT DOCUMENTS

| 5,210,829 A | * | 5/1993 | Bitner ........................ 710/57 |
| 5,212,798 A | * | 5/1993 | Kanda ........................ 711/112 |
| 5,652,916 A | * | 7/1997 | Murakami et al. ............ 710/52 |
| 5,742,444 A |   | 4/1998 | Ozue |
| 5,752,257 A | * | 5/1998 | Ripoll et al. ................. 711/114 |
| 5,872,997 A |   | 2/1999 | Golson |
| 5,892,633 A |   | 4/1999 | Ayres et al. |
| 6,023,709 A |   | 2/2000 | Anglin et al. |
| 6,141,729 A | * | 10/2000 | Ishida et al. ................. 711/114 |
| 6,353,878 B1 |  | 3/2002 | Dunham |
| 6,480,904 B1 | * | 11/2002 | Kato et al. ..................... 710/6 |
| 6,732,232 B2 | * | 5/2004 | Krishnamurthy ............ 711/114 |

FOREIGN PATENT DOCUMENTS

| EP | 1 222 524 | 7/2002 |
| JP | 5-307444 | 11/1993 |
| WO | 01/22210 | 3/2001 |

* cited by examiner

*Primary Examiner*—Kim Huynh
*Assistant Examiner*—Joshua D. Schneider
(74) *Attorney, Agent, or Firm*—Wenderoth, Lind & Ponack, L.L.P.

(57) ABSTRACT

The data storage system 1 comprises tape drives 21 to 23 operable to read and write data transmitted via the SCSI bus 112 from and on a tape in parallel and a host PC 4 for controlling data transmission to the SCSI bus. The host PC 4 includes a data access control unit 41 operable to calculate a bus reconnect timing that makes it possible to avoid stopping tape writing or reading even when any one of the respective drive drives 21 to 23 waits for the time when the other tape drives finish data transmitting after it reaches a bus reconnect timing based on the tape drive information "(the number of drive units, a data transmission speed of the bus, either a data reading speeds of the respective drive units or a data writing speeds of the respective drive units)=(m, S and R)".

31 Claims, 12 Drawing Sheets

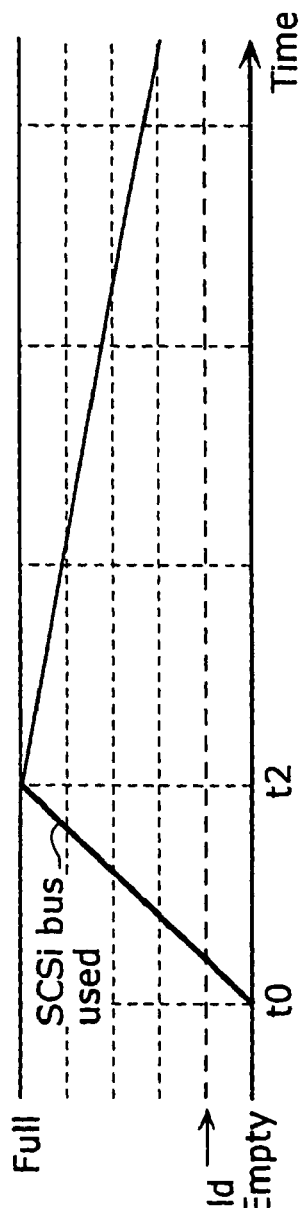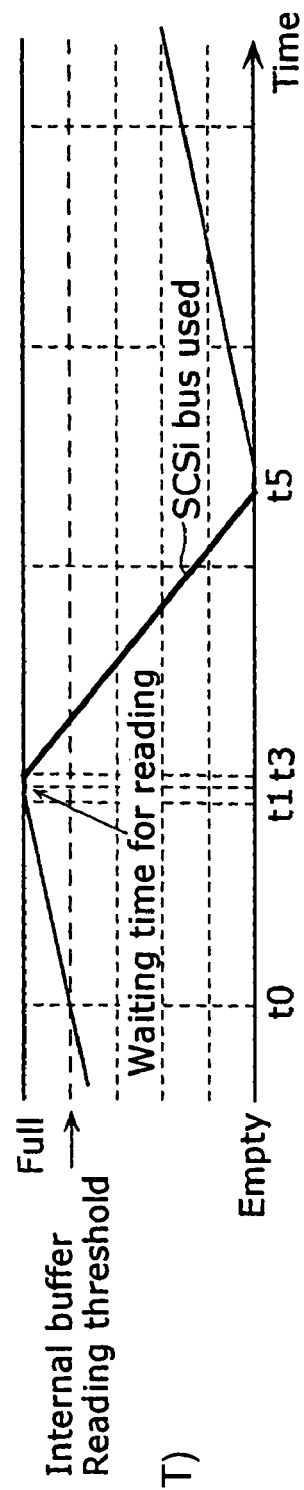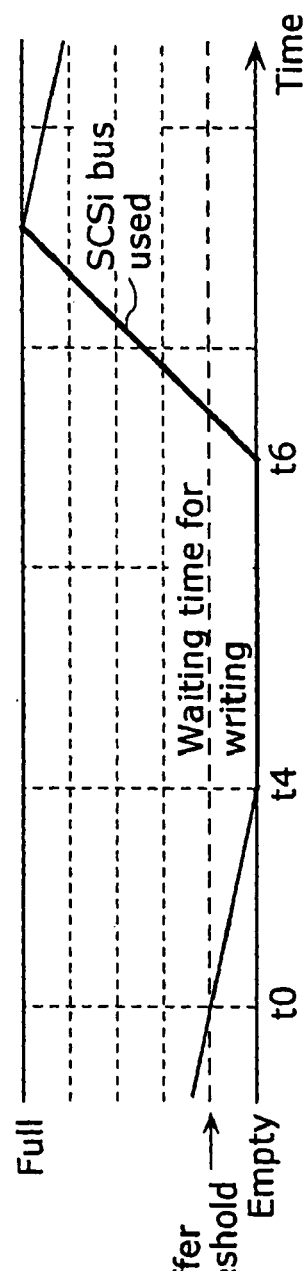
Fig. 2A (PRIOR ART)
Fig. 2B (PRIOR ART)
Fig. 2C (PRIOR ART)

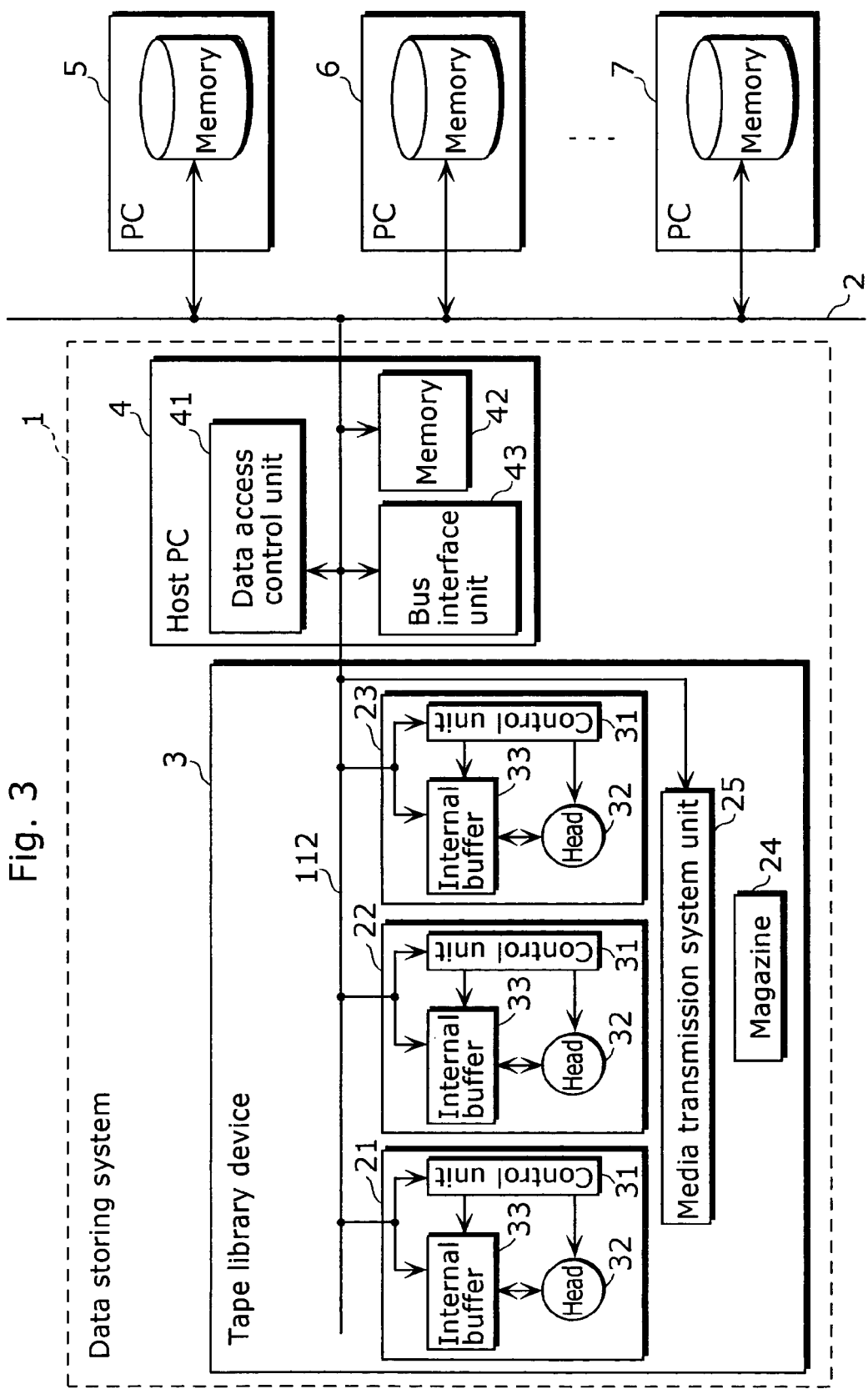

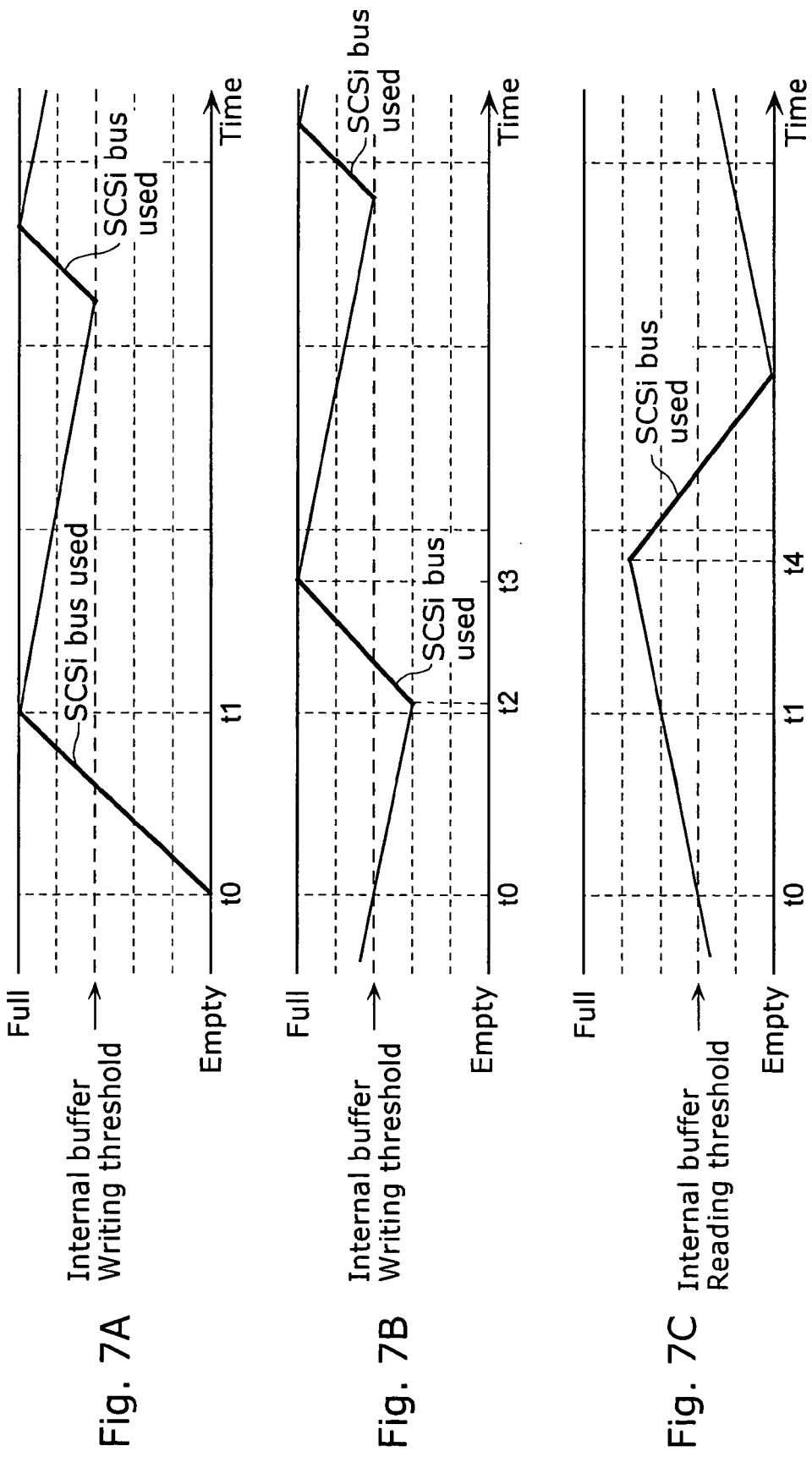

Fig. 9

| i | Tape drive | S (Mbytes/s) | Mi (Mbytes) | Ri (Mbytes/s) | Ki | Mi(ki+1) | Ni | (2M-Ni)/Mi-2 |
|---|---|---|---|---|---|---|---|---|
| 1 | 510 | 80 | 12 | 10 | 8 | 108 | 16 | 4 |
| 2 | 520 | | 16 | 13 | 6 | 112 | 12 | 4.75 |
| 3 | 530 | | 16 | 16 | 5 | 96 | 12 | 4.75 |
| | Total | — | 44 (M) | 39 (R) | — | — | — | — |

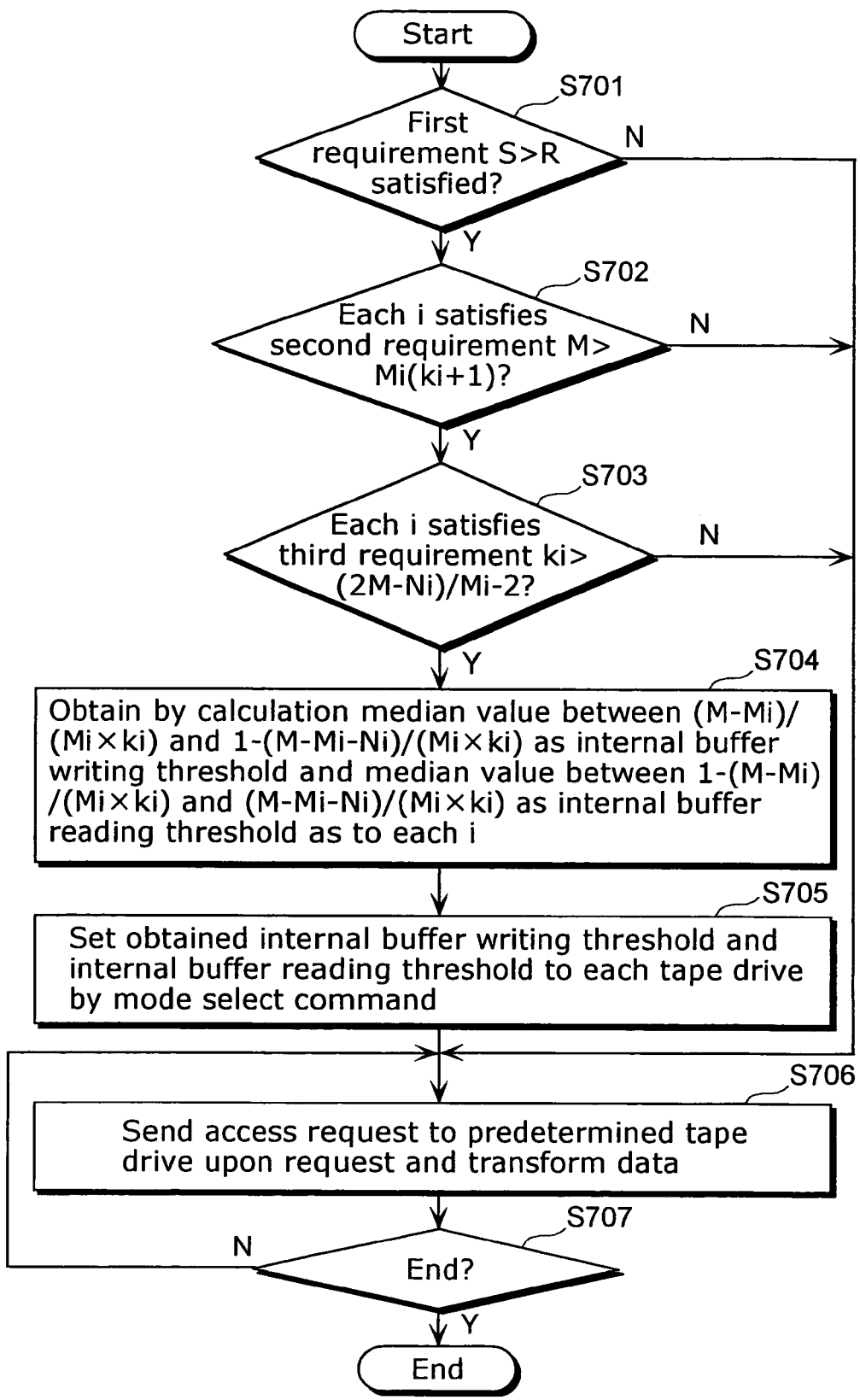

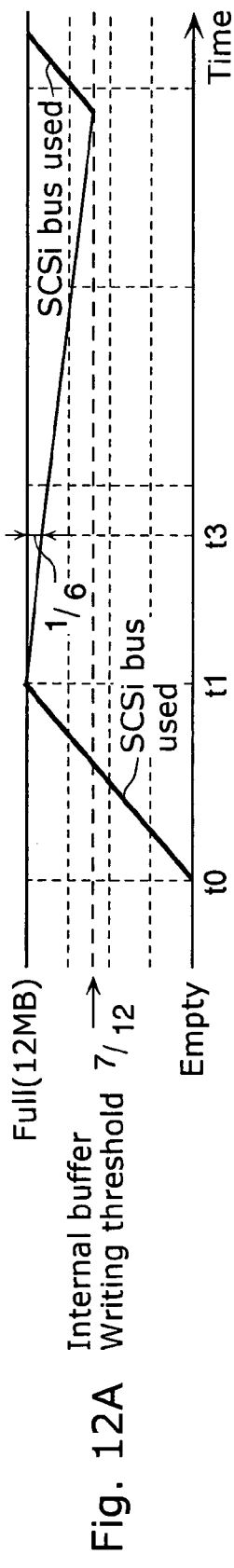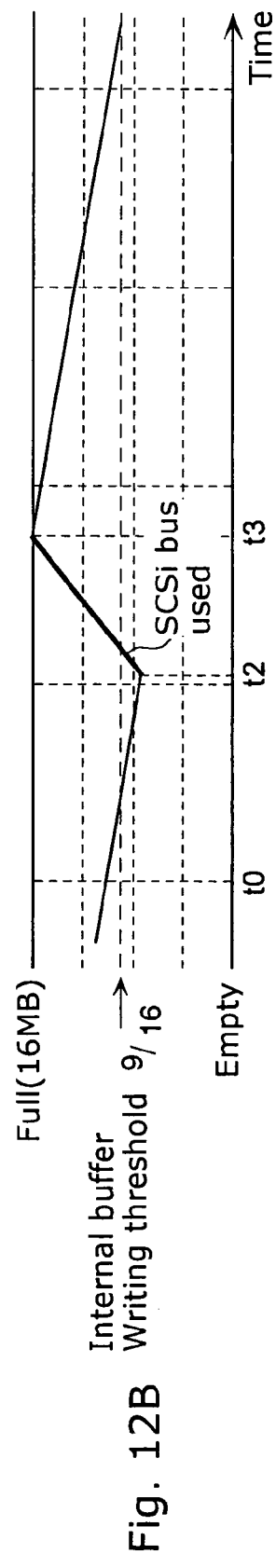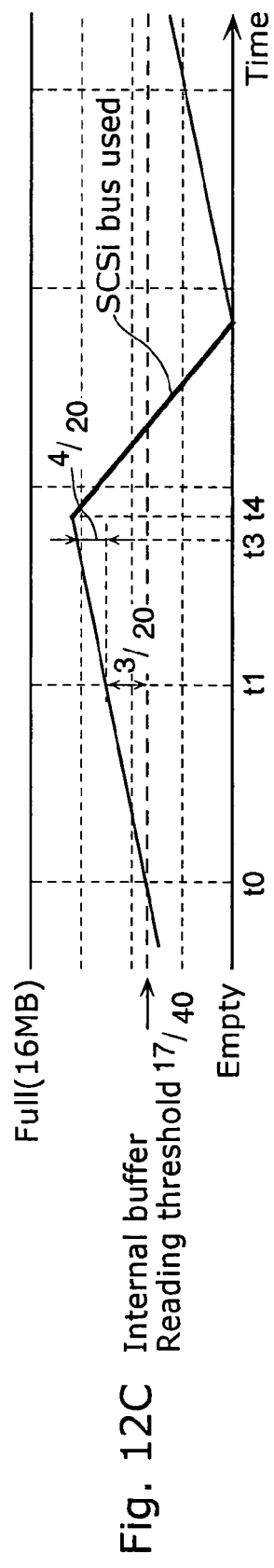

DATA STORING SYSTEM AND TRANSMISSION CONTROL METHOD

BACKGROUND OF THE INVENTION (1) Field of the Invention

The present invention relates to a data storing system in which a plurality of storing media drives exist on a single bus.

(2) Description of the Related Art

Drives such as optical disc drives, hard disk drives and tape drives and the like have been conventionally used for creating backup of large amount of data on storing media. FIG. 1 is a block diagram showing the structure of the conventional data storing system with a plurality of tape drives. The data storing system 101 comprises a data access control unit 111, a small computer system interface (SCSI) bus 112 and tape drives 121 to 123 of same-specification. The tape drives 121 to 123 are connected with the data access control unit 111 via the SCSI bus 112. The data access control unit 111 is a personal computer or the like and comprises a CPU 113, a memory 114 and a bus interface unit 115 inside.

The data access control unit 111 is connected with the hard disk 102 that is an external device, sends the access request to the tape drives 121 to 123 and the hard disk 102 by receiving a request from a user, and executes a data transmission between the tape drives 121 to 123 and the hard disk 102. The SCSI bus 112 is a data transmission line for realizing a parallel data transmission between the data access control unit 111 connected with the SCSI bus 112 and the external device. The CPU 113 is an operation processing unit for executing a control program held in the memory 114 and controlling the data transmission in the data storing system 101. The memory 114 is realized by a read only memory (ROM), a random access memory (RAM), a hard disk or the like, and it prestores the control program of the data access control unit 111 and provides a storage area for storing the data of the data access control unit 111 temporally. The bus interface unit 115 is a processing unit for executing the interface function between the data access control unit 111 and the SCSI bus 112. The tape drives 121 to 123 receive an access request from the data access control unit 111 and perform data reading from a tape and data writing on a tape.

The tape drives 121 to 123 have an internal buffer respectively, temporally store the data transferred via the SCSI bus 112 in the internal buffers, read the stored data from the internal buffers and write the data on a tape. Also, when reading, the tape drive 121 to 123 temporally store the data read from the tape in the internal buffers and then send the data from the internal buffers to the SCSI bus 112. FIG. 2 is a graph showing temporal changes of the data amount stored in the internal buffers of the respective tape drives 121 to 123 shown in FIG. 1. FIG. 2A is a graph showing temporal changes of the data amount stored in the internal buffers of the tape drive 121 when writing data. FIG. 2B is a graph showing temporal changes of the data amount stored in the internal buffers of the tape drive 122 when reading data. FIG. 2C is a graph showing temporal changes of the data amount stored in the internal buffers of the tape drive 123 when writing data. Here, the respective tape drives 121 to 123 perform tape reading or writing in parallel. As shown in FIG. 2A, the tape drive 121 performs data writing processing, and the data to be transmitted via the SCSI bus 112 is stored in the internal buffer. For example, data transmitted via the SCSI bus 112 is stored in the internal buffer to its full level between time t0 and time t1. When the internal buffer is going to overflow, the tape drive 121 disconnects the SCSI bus 112 and stops data transmitting from the data access control unit 111 to the internal buffer until the data amount stored in the internal buffer reaches the internal buffer writing threshold, that is, the timing of reconnecting the bus.

On the other hand, meanwhile, data is read from the tape to the internal buffer of the tape drive 122 and the read data is stored in the internal buffer. The tape drive 122 cannot use the SCSI bus 112 because the SCSI bus 112 is used by the tape drive 121 that has the higher priority although the data read from the tape is stored in the internal buffer and reaches the timing of reconnecting the bus (at the time t0). Consequently, the tape drive 122 stops running the tape and reading the data from the tape when the internal buffer is going to overflow (at the time t1). When the SCSI bus 112 is disconnected (at the time t2) by the tape drive 121, the tape drive 122 that has the next bus use right reconnects with the SCSI bus 112, reads the data stored in the internal buffer and starts transmitting the data to the data access control unit 111 (at the time t3).

Meanwhile, for example, as the data stored in the internal buffer has been already read, the tape drive 123 cannot use the SCSI bus 112 because the use right of the SCSI bus 112 is given to the tape drive 122 even when the remaining data amount of the internal buffer reaches the internal buffer writing threshold (the timing of reconnecting the bus) at this timing (at the time t2). Therefore, the tape drive 123 stops running the tape and writing the data on the tape when the internal buffer of the tape drive 123 is going to underflow (at the time t4).

Also, meanwhile, the data stored in the internal buffer of the tape drive 122 is transmitted to the data access control unit 111 via the SCSI bus 112, and the remaining data amount of the internal buffer becomes empty (at the time t5). When the data stored in the internal buffer by reading out the data is going to underflow, the tape drive 122 disconnects the SCSI bus 112 and stops data transmitting from the internal buffer to the data access control unit 111 until the data read from the tape reaches the internal buffer reading threshold (the timing of reconnecting the bus). In this way, the tape drive 123 can acquire the use right of the SCSI bus 112, reconnect with the SCSI bus 112 and start data transmitting from the data access control unit 111 to the internal buffer (at the time t6).

However, as the tape drive needs repositioning of the tape position when the tape running is stopped, there occurs a several second time loss before starting the next reading or writing and there also occurs a problem that frequent stoppage of running the tape causes the deterioration of the data transmission performance or the damage (abrasion or the like) of the components. Also, when using a plurality of disc drives instead of the above-mentioned tape drives 121 to 123, when data writing is stopped depending on the condition of the internal buffer, (i) there is a problem that rotational delay occurs until the head reaches the next writing position on the track depending on the head position when starting the next data writing. This problem is remarkable when using an optical disc drive with a slower disc rotation speed rather than a hard disk drive with a shorter access time, (ii) there is another problem that the data to be written next is not exactly continuous to the data written just before in the disc drive such as a CD-R, a DVD-R or the like because there is a need to make makers at intervals from the previously written data to the current data when resuming writing. Therefore, data is written at intervals on the tracks of the whole disc, which means useless free space to store the data is generated. As this free space occurs in a unit of some ten megabytes to 100 megabytes every time, the amount of the free space in the whole disc and the whole data storing system is not negligible when data writing is frequently stopped.

Therefore, the conventional tape drive performs the following steps of: first, calculating the data transmission rate between the data access control unit 111 and the internal buffers using the formula of "(transmitted data amount)/ (transmission time)" whenever necessary or by always monitoring the data amount in the internal buffers; second, detecting the decrease in the transmission rate caused by the impossibility of reconnecting with the SCSI bus 112 or the state of the internal buffer that is going to overflow or underflow frequently; third, dynamically preventing the internal buffers from overflowing or underflowing by decreasing the tape running speed or by advancing the timing of reconnecting the bus; and finally, controlling the data access so as not to stop running the tape as much as possible.

The above-mentioned things are written in Japanese Laid-Open Patent application No. 05-307444.

In the conventional method, the data transmission rate between the data access control unit 111 and the internal buffer is calculated whenever necessary, the running speed of the tape is dynamically controlled monitoring the data amount in the internal buffer all the time, and the timing of reconnecting the bus is changed. However, there is a need to add several functions such as a data transmission rate calculation function, an internal buffer monitoring function, a tape running speed control function and a bus reconnect timing dynamically changing function to the drive unit. Therefore, there occurs a problem that the data storing system costs much resulting from the structure of the tape drive becoming complicated.

Also, as only reconnect control is performed based on the data transmission rate at the timing without considering the number of drive units connected with the same bus in the conventional method where the bus reconnect timing is dynamically controlled, there is a problem that the conventional method is not necessarily effective under the condition where a plurality of drive units exist on the same bus.

SUMMARY OF THE INVENTION

The present invention is invented considering the above-mentioned problems and aims at providing a data storing system with a simple structure that statically controls underflow and overflow of the internal buffer in each drive unit under the circumstance where a plurality of drive units exist on the same bus.

In order to achieve the above-mentioned purpose, the data storing system of the present invention comprises: a plurality of drive units for writing data transmitted via a bus on a storing media and reading data from a storing media and transmitting the data via the bus in parallel; and a transmission control device for controlling data transmission made by each of said plurality of drive units respectively, wherein the transmission control device includes: a bus control unit operable to give a bus use right responding to a request for a bus use right made by the respective drive units according to predetermined rules; a request threshold calculation unit operable to calculate a request threshold showing a timing at which the respective drive units request the bus use right based on the number of the drive units, a data transmission speed of the bus and either a data reading speed or a data writing speed of the respective drive units; and a request threshold notification unit operable to notify the respective drive units of the calculated request threshold, and the respective drive units include: a buffer for storing data transmitted between the storing medium and the bus temporally; a recording head for reading the data from the storing medium so as to store the data in the buffer and read the data from the buffer so as to write the data on the storing medium; and a control unit for requesting and acquiring the bus use right and transmit the data between the buffer and the bus when data amount in the buffer increases or decreases to the notified request threshold.

In this way, the request threshold calculation unit calculates the request threshold showing the timing of each drive unit's requesting the bus use right taking into account the number of drive units on the same bus, which brings an effect that it becomes possible to assign the bus use right to each drive unit more evenly under the circumstance where a plurality of drive units exist on the same bus.

Also, in the data storing system of the present invention, the request threshold calculation unit may include a reading threshold calculation unit operable to calculate reading thresholds which are the request thresholds at the time of data reading in the respective drive units so that the thresholds make it possible to prevent data in the buffer from overflowing even when one of the drive units that has already made a request for the bus use right waits until the other drive units finish data transmission using the bus based on the number of the drive units, the data transmission speed of the bus and the data reading speed from the storing medium, the request threshold notification unit may notify the respective drive units of the calculated reading thresholds as the request thresholds at the time of data reading, the recording head may read data from the storing medium so as to store the data in the buffer, and the control unit may request and acquire the bus use right and send the data from the buffer to the bus when the data amount in the buffer increases and reaches the notified reading threshold.

In this way, the reading threshold calculation unit can calculate the reading threshold so as to have respective drive units use the bus more evenly and send the data in the buffers to the bus according to the number of drive units and the relation between the data transmission speed of the bus and the data reading speed of the recording head, which brings an effect that it becomes possible to send the data in the buffer to the bus before the data in the buffer of each drive unit overflows.

Also, in the data storing system of the present invention, the reading threshold calculation unit may calculate the reading thresholds that satisfy "the buffer use rate$\leq 1-(m-1)/k$", when $mR<S$ on condition that the respective drive units have the same data reading speed from the storing medium and the same buffer storage capacity, where, "m" is the number of drive units ("m" is a natural number), "R" is a data reading speed from the storing medium, "S" is a data sending speed from the buffer to the bus, "k" is a speed ratio "$(S-R)/R$" ("k" is a natural number).

In this way, there is an effect that it is possible to send the data in a buffer to the bus before the data in the buffer overflows even when respective drive units request the bus use right under the circumstance where a plurality of the same performance drive units exist and then one of the drive units waits until the other drive units finish using the bus.

Also, in the data storing system of the present invention, the bus control unit may arbitrate the bus use right according to priorities of the bus use right based on the ID numbers of the respective drive units, the reading threshold calculation unit may further calculate the reading thresholds that satisfy "the buffer use rate≧(m−2)/k", when the speed ratio "k" and the number of the drive units "m" satisfy "k>(2m−3)".

In this way, as respective drive units wait for requesting the bus use right after using the bus for the time period needed for the other drive units to acquire the bus use right when reading data from a recording medium, chances are high that the respective drive units can acquire the bus use right evenly without allowing the specific drive units that have a higher priority to monopolize the bus use right. Therefore, there is an effect that chances become higher that the bus use right is acquired before any overflow occurs in the buffers of the respective drive units. Also, it is possible to prevent respective drive units from requesting the bus use right frequently, which brings an effect that it is possible to prevent the data transmission efficiency of the bus from decreasing.

Also, in the data storing system of the present invention, drive units different in performance can be included in the plurality of drive units (the number of drive units: m), and the reading threshold calculation unit may calculate the reading threshold of the "i" th ("1≦i≦m": "i" is a natural number) drive unit satisfying "the buffer use rate≦1−{(ΣTi)−Ti}·Ri/Mi" on condition that each "i" satisfies "{(ΣTi)−Ti}·Ri<Mi", when ""Ri"s in total<S", where, in the "i" th drive unit, "Mi" is the buffer storing capacity, "Ri" is a data reading speed from the storing medium, "S" is a data sending speed from the buffer to the bus, time needed for changing the buffer from full to empty is "Ti=Mi/(S−Ri)".

In this way, there is an effect that the possibility of acquiring the bus use right before overflow occurs in the buffer of any drive unit is becoming higher even under the circumstance where a plurality of drive units that are different in internal performance exist.

Also, in the data storing system of the present invention, the bus control unit may arbitrate the bus use right according to priorities of the bus use right based on ID numbers of the respective drive units, the reading threshold calculation unit may calculate the reading threshold of the "i" th drive unit satisfying "the buffer use rate≧{(ΣTi)−(Ni+Ti)}·Ri/Mi", when the Ti, the Ni and the Ri satisfy "{(ΣTi)−Ti}·Ri+{(ΣTi)−(Ni+Ti)}·Ri<Mi" as to each "i", where, the smallest value except time Ti of the "i" th drive unit in "Ti"s of the respective drive units as Ni.

In this way, chances are high that respective drive units can acquire the bus use right evenly without allowing the specific drive units to monopolize the bus use right even under the circumstance where a plurality of drive units that are different in internal performance exist.

Further, in the data storing system of the present invention, the request threshold calculation unit may include a writing threshold calculation unit operable to calculate the writing thresholds which are the request thresholds at the time of data writing in the respective drive units so that the thresholds make it possible to prevent data in the buffer from underflowing even when one of the drive units that has already made a request for the bus use right waits until the other drive units finish data transmission using the bus based on the number of the drive units, the data transmission speed of the bus and the data writing speed on the storing medium, the request threshold notification unit may notify the respective drive units of the calculated writing thresholds as the request thresholds at the time of data writing, the recording head may read data from the buffer so as to write the data on the storing medium, and the control unit may request and acquire the bus use right and send the data from the bus to the buffer when data amount in the buffer decreases and reaches the notified writing threshold.

In this way, the writing threshold calculation unit can calculate the writing threshold so as to have the respective drive units use the bus evenly and acquire the data from the bus to the buffers according to the number of drive units and the relation between the data transmission speed of the bus and the data writing speed of the recording head, which brings an effect that it becomes possible to acquire the data from the bus to the buffer before the data in the buffer of each drive unit underflows.

Also, in the data storing system of the present invention, the writing threshold calculation unit may calculate the writing thresholds that satisfy "the buffer use rate≧(m−1)/k", when mR<S on condition that the respective drive units have the same data writing speed on the storing medium and the same buffer storage capacity, where, "m" is the number of drive units ("m" is a natural number), "R" is a data writing speed on the storing medium, "S" is a data acquiring speed from the bus to the buffer, "k" is a speed ratio "(S−R)/R" ("k" is a natural number).

In this way, when writing, there is an effect that chances become higher that the bus use right is acquired before any underflow occurs in the buffers of the respective drive units even when respective drive units request the bus use right under the circumstance where a plurality of the same performance drive units exist and then each of the drive units waits until the other drive units finish using the bus.

Also, in the data storing system of the present invention, the bus control unit may arbitrate the bus use right according to priorities of the bus use right based on the ID numbers of the respective drive units, the writing threshold calculation unit may further calculate the writing thresholds that satisfy "the buffer use rate≦1−(m−2)/k", when the speed ratio "k" and the number of drive units "m" satisfy "k>(2m−3)".

In this way, when writing, as respective drive units wait for requesting the bus use right after using the bus for the time period needed for the other drive units to acquire the bus use right, chances are high that respective drive units can acquire the bus use right evenly without allowing the specific drive units that have a higher priority to monopolize the bus use right. Therefore, there is an effect that chances become higher that the bus use right is acquired before any underflow occurs in the buffers of the respective drive units. Also, it is possible to prevent respective drive units from requesting the bus use right frequently, which brings an effect that it is possible to prevent the data transmission rate of the bus from decreasing.

Also, in the data storing system of the present invention, drive units different in performance can be included in the plurality of drive units (the number of drive units: m), and the writing threshold calculation unit may calculate the writing threshold of the "i" th ("1≦i≦m": "i" is a natural number) drive unit satisfying "the buffer use rate≧{(ΣTi)−Ti}·Ri/Mi" on condition that each "i" satisfies "{(ΣTi)−Ti}·Ri<Mi", when ""Ri"s in total<S", where, in the "i" th drive unit, "Mi" is the buffer storage capacity, "Ri" is a data writing speed on the storing medium, "S" is a data acquiring speed from the bus to the buffer, time needed for changing the buffer from empty to full is "Ti=Mi/(S−Ri)".

In this way, when writing, there is an effect that the possibility of drive units' acquiring the bus use right before underflow occurs in the buffer of any drive unit is becoming higher even under the circumstance where a plurality of drive units that are different in internal performance exist.

Also, in the data storing system of the present invention, the bus control unit may arbitrate the bus use right according to priorities of the bus use right based on ID numbers of the respective drive units, the writing threshold calculation unit may calculate the writing threshold of the "i" th drive unit satisfying "the buffer use rate$\geq 1-\{(\Sigma Ti)-(Ni+Ti)\}\cdot Ri/Mi$", when the Ti, the Ri and the Ni satisfy "$\{(\Sigma Ti)-Ti\}\cdot Ri+\{(\Sigma Ti)-(Ni+Ti)\}\cdot Ri<Mi$" as to each "i", where, the smallest value except time Ti of the "i" th drive unit in "Ti"s of the respective drive units as Ni.

In this way, when writing, chances are high that respective drive units can acquire the bus use right evenly without allowing the specific drive units that have a higher priority to monopolize the bus use right even under the circumstance where a plurality of drive units that are different in internal performance exist. Also, there is an effect that it is possible to avoid the decrease in the data transmission rate of the bus caused by the frequent requests for a bus use right made by the drive units that have higher priorities.

Also, the present invention can be realized not only as the data storing system like this but also as a single unit composing these data storing system such as a host PC, a tape library, a disc library, a tape drive, a disc drive and a data access control unit, as a data access control method comprising steps of these characteristic operations in these data storing system, or as a program for having a general-purpose computer such as a personal computer execute these characteristic operations to function these operations. In addition, it is needless to say that the program can be distributed using a computer-readable storing medium such as a CD-ROM or via a communication medium such as the Internet.

FURTHER INFORMATION ABOUT TECHNICAL BACKGROUND TO THIS APPLICATION filed, is incorporated herein by reference.

Japanese Patent application No. 2002-325385 filed Nov. 8th, 2002.

BRIEF DESCRIPTION OF THE DRAWINGS

These and other subjects, advantages and features of the invention will become apparent from the following description thereof taken in conjunction with the accompanying drawings that illustrate a specific embodiment of the invention. In the Drawings:

FIG. 2 is a graph showing temporal changes of data amount stored in the internal buffer in the respective tape drives 121 to 123 shown in FIG. 1. FIG. 2A shows temporal changes when the tape drive 121 writes data. FIG. 2B shows temporal changes when the tape drive 122 reads data. FIG. 2C shows temporal changes when the tape drive 123 writes data.

FIG. 3 is a block diagram showing the structure of the data storing system in the first embodiment of the present invention.

FIG. 6 is a graph showing temporal changes of data amount stored in the internal buffer in the respective tape drives 21 to 23 shown in FIG. 3.

FIG. 7 is a graph showing temporal changes of data amount stored in the internal buffer in the respective tape drives 21 to 23 shown in FIG. 3. FIG. 7A shows temporal changes when the tape drive 21 writes data. FIG. 7B shows temporal changes when the tape drive 22 writes data. FIG. 7C shows temporal changes when the tape drive 23 reads data.

FIG. 9 is an association table showing the relation between the respective parameter values in tape drives.

FIG. 10 is a flow chart showing the bus reconnect timing setting operation for the tape drive by the data access control unit shown in FIG. 8.

FIG. 11 is a graph showing temporal changes of data amount stored in the internal buffer in the respective tape drives 510, 520 and 530 shown in FIG. 8.

FIG. 12 is a graph showing temporal changes of data amount stored in the internal buffer in the respective tape drives 510, 520 and 530 shown in FIG. 8. FIG. 12A shows temporal changes when the tape drive 510 writes data. FIG. 12B shows temporal changes when the tape drive 520 writes data. FIG. 12C shows temporal changes when the tape drive 530 reads data.

DESCRIPTION OF THE PREFERRED EMBODIMENT(S)

Figure 1:
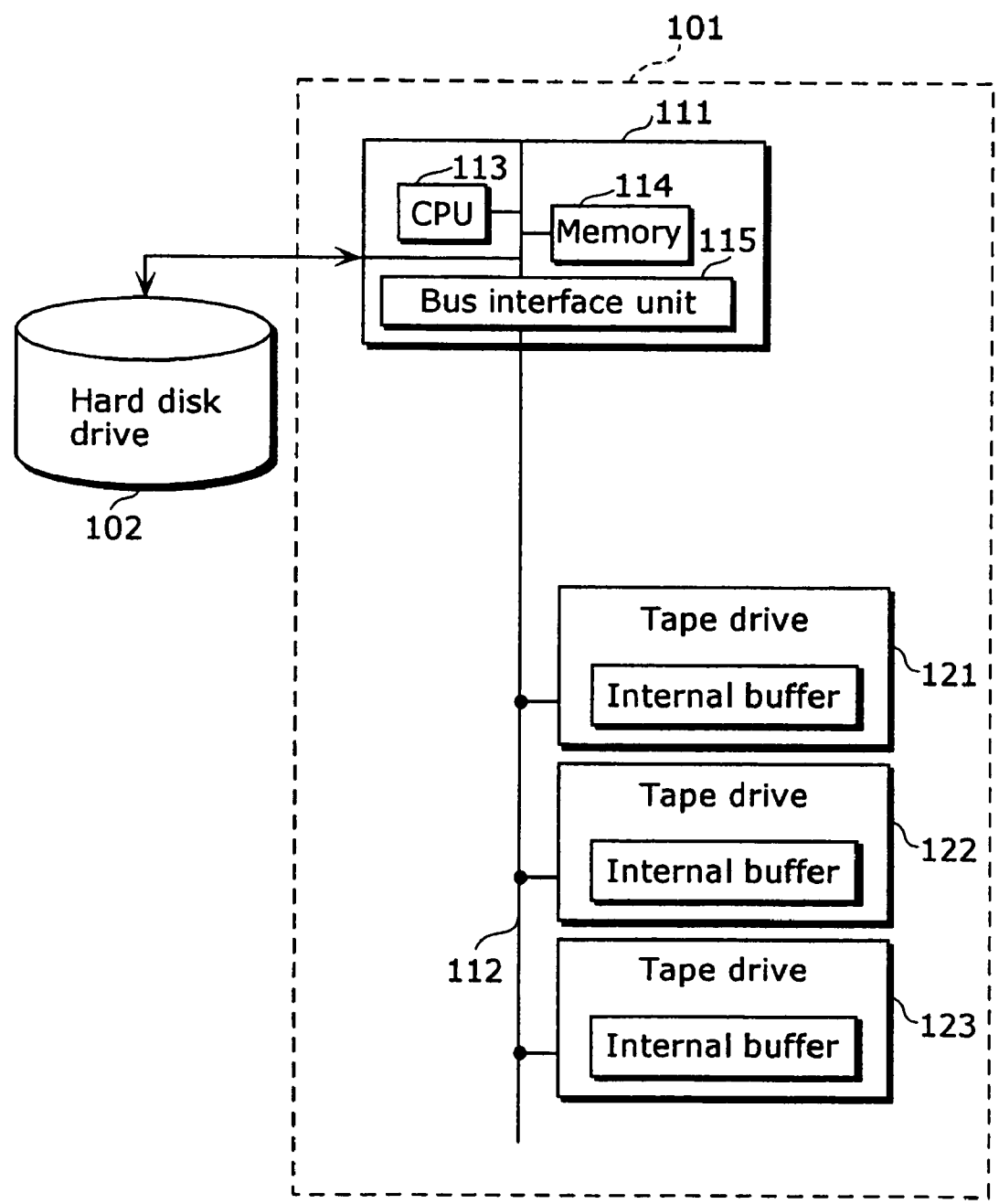
FIG. 1 is a block diagram showing the structure of the conventional data storing system that has a plurality of tape drives.

Embodiments of the present invention will be explained below with reference to FIG. 3 to FIG. 12.

(First Embodiment)

FIG. 3 is a block diagram showing the structure of the data storing system 1 in the first embodiment of the present invention. Note that the same reference numbers are assigned to the same units in FIG. 3 as the ones in the conventional data storing system 101 and explanations for these units are omitted. The data storing system 1 of the first embodiment is a data storing system for statically controlling bus reconnect timing in a plurality of tape drives connected with a SCSI bus according to the number of the tape drives, a data transmission speed between a tape drive and an internal buffer, a data transmission speed between an internal buffer and a SCSI bus. The data storing system 1 comprises a host personal computer (PC) 4, a SCSI bus 112 and a tape library 3. The data storing system 1 is connected with other PCs 5 to 7 that have a storing unit such as a hard disk via local area network (LAN) 2.

The tape library 3 has three (m=3) same specification tape drives 21 to 23, a magazine 24 for storing a plurality of tape media and a media transmission system unit 25 for taking out tape media from the magazine and transmits them to one of tape drives 21 to 23. The tape drives 21 to 23 and the media transmission system unit 25 are connected with the host PC 4 via the SCSI bus 112. Also, the tape drives 21 to 23 is a device for reading data from tapes and writing data on tapes upon receiving an access request from the host PC 4, and the respective tape drives comprise a control unit 31, a recording head 32 and an internal buffer 33 inside. The respective control units 31 receive data showing bus reconnect timing calculated in the host PC 4 from the host PC 4 when the data storing system 1 is activated so as to hold the data, controls the respective internal buffers 33 so that they perform bus reconnect at the specified timing and controls data writing and reading operations by the recording head 32. The recording head 32 writes the data read from the internal buffer 33 on tape media, reads the data written on the tape media from the tape media so as to output the data to the internal buffer 33. The internal buffer 33 stores data transmitted between the host PC 4 and a tape via the SCSI bus 112, and buffers the difference in speed between the writing and the reading speeds to a magnetic tape of the tape drives 21 to 23 and the data transmission speed of the SCSI bus 112.

The transmission performance (S=80) of the SCSI bus 112 is 80 megabytes per second. Also, the use right of the SCSI bus 112 priorities are set according to the bus arbitration based on the SCSI ID numbers as follows: first, the host PC 4; second, the tape drive 21; third, the tape drive 22; fourth, the tape drive 23 and lastly, the media transmission system unit 25.

The host PC 4 is a PC that calculates bus reconnect timing of the respective tape drives when the data storing system 1 is activated so as to decrease the stoppage frequency of tape running by having the respective drive units connected with the SCSI bus use the SCSI bus evenly and to output the bus reconnect timing gotten as the calculation result to the respective drive units. The host PC 4 comprises a data access control unit 41, a memory 42 and a bus interface unit 115. The host PC4 sends an access request to the predetermined tape drives 21 to 23 or a tape media transmission request to the media transmission system unit 25 upon receiving a request for data backup from the external PCs 5 to 7, and executing data transmission between the storing device in the external PCs 5 to 7 and the tape library 3 via LAN 2. The data access control unit 41 is a unit operable to perform bus arbitration to the respective units in the host PC 4 and the tape library 3 that are connected with the SCSI bus 112 and to calculate bus reconnect timing of the respective tape drives 21 to 23 according to the number of tape drives 21 to 23 connected with the SCSI bus 112, the data transmission speed of the SCSI bus 112, the writing and the reading speeds of the tape drives 21 to 23. The memory 42 holds the control program of the host PC 4 like the conventional memory 113 and has a storing area for storing data temporally. Also, when the data access control unit 41 executes the calculation processing of the bus reconnect timing, it pre-stores the calculation program. The bus interface unit 43 has an interface function with the SCSI bus 112 like the conventional bus interface unit 115 and executes data transmission between the host PC 4 and the tape library 3.

Operations by the data storing system 1 formed as mentioned above will be explained in detail below.

In the above-mentioned data storing system 1, the respective tape drives 21 to 23 perform data reading and writing on tapes in parallel and perform data transmission, for example, between the host PC 4 and the internal buffer 33 via the SCSI bus 112 at the transmission rate of 80 megabytes per second (S=80), between the internal buffer 33 and a tape at the transmission rate of 13 megabytes per second (R=13).

Also, as a precondition at the time of data reading, the respective one of tape drives 21 to 23 whose internal buffer is going to underflow disconnects the bus to stop data transmission from the internal buffer 33 to the host PC 4 until data reaches the internal buffer reading threshold, that is, bus reconnect timing like a conventional tape drive. When the internal buffer 33 is going to overflow, the tape drive stops running the tape and data reading from the tape because it is impossible to use the SCSI bus 112 even when the data amount reaches the bus reconnect timing. Also, at the time of data writing, the respective one of tape drives 21 to 23 whose internal buffer 33 is going to overflow when writing data disconnects the bus to stop data transmission from the host PC 4 to the internal buffer 33 until data reaches the internal buffer writing threshold, that is, bus reconnect timing. The tape drive whose internal buffer 33 is going to underflow stops running the tape and data writing on the tape because it is impossible to use the SCSI bus 112 even when the data reaches the bus reconnect timing.

As these internal buffer thresholds in the tape drives 21 to 23 are variable, it is possible to change the internal buffer writing threshold and the internal buffer reading threshold by sending an internal buffer threshold change request, that is, a mode select command from the host PC 4 to the tape drives 21 to 23.

Figure 4:
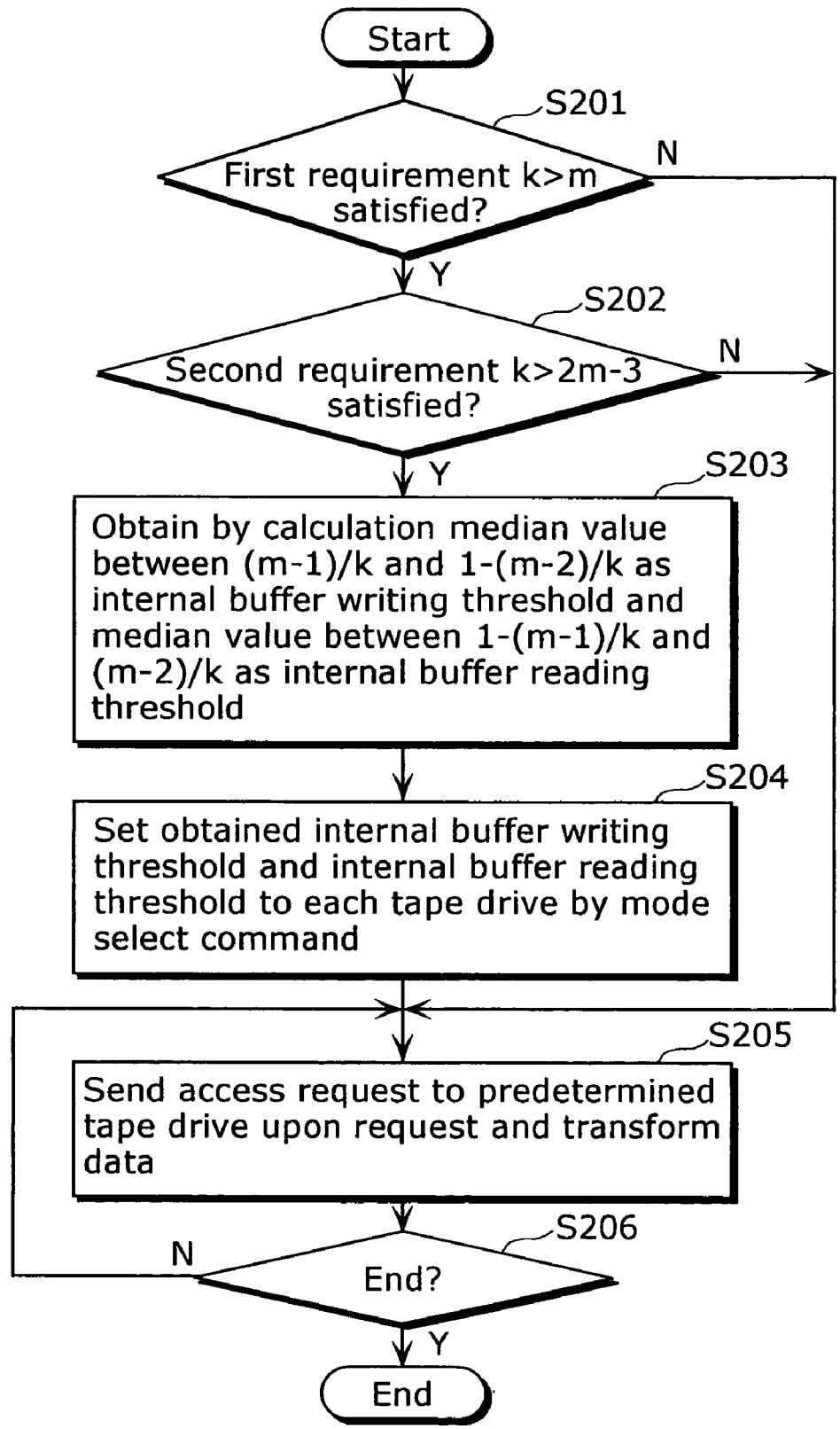
FIG. 4 is a flow chart showing the bus reconnect timing setting operation for the tape drive by the data access control unit shown in FIG. 3.

FIG. 4 is a flow chart showing bus reconnect timing setting operations of the tape drives 21 to 23 by the data access control unit 41 shown in FIG. 3. The data access control unit 41 detects the number of tape drives 21 to 23 connected with the SCSI bus 112 before starting the processing for an access request to the tape drives 21 to 23, detects the number of tape drives connected with the SCSI bus 112, calculates the formula "integer k=(S−R)/R" using parameters S and R of the tape drives 21 to 23, and checks whether the first prerequisite "mR<S" is satisfied or not (S201).

In other words, the first prerequisite shows the following things as conditions: the data transmission speed S of the SCSI bus 112 must be more than "m" times faster than the data reading speed R of the respective tape drives 21 to 23, in addition, it is possible to change internal buffers from full to empty and vice versa of "m" numbers of tape drives by the SCSI bus 112's data transmission while an internal buffer changes from empty to full and vice versa by reading the data from the tape. This is also the prerequisite to distribute the use right of the SCSI bus 112 from a tape drive to the next tape drive roughly in sequential order according to the priorities. When the integer k and the number of tape drives 21 to 23 m satisfy the first prerequisite, the data access control unit 41 checks whether the integer k is bigger than the result of the formula "(m−1)+(m−2)=2m−3" or not, that is, whether "k" and "m" that is the number of tape drives 21 to 23 satisfy the second prerequisite "2m−3<k" or not (S202).

This second prerequisite shows the prerequisite so as not to reverse the upper limit and the lower limit, both limits are also bus reconnect request timings, of the remaining data amount in the internal buffers in the respective tape drives 21 to 23. Therefore, the following control cannot be executed when this second prerequisite is not satisfied.

Figure 5A:
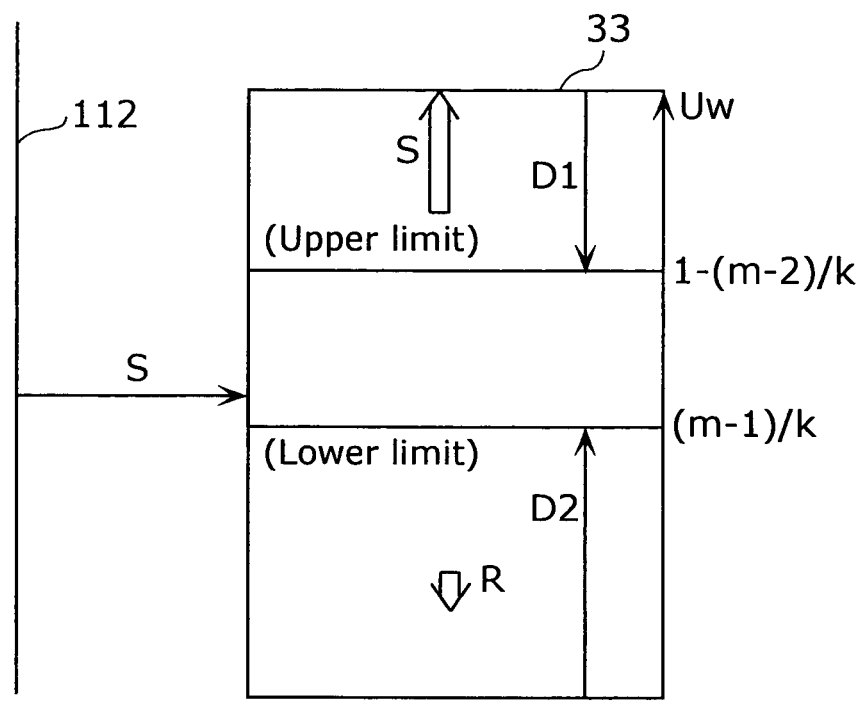
FIG. 5A is a diagram showing the upper and the lower limits of the internal buffer writing threshold of a tape drive using the internal buffer use rate Uw.

The idea of the data access control method in the data storing system 1 of this embodiment will be explained below. FIG. 5A is a diagram showing the upper limit and the lower limit of the internal buffer writing threshold in the internal buffer 33 of a tape drive as the internal buffer use rate Uw. The internal buffer use rate Uw shows the rate of the remaining data amount stored in the internal buffer providing that the capacity of the internal buffer is 1. As shown in FIG. 5A, the internal buffer 33 receives data from the SCSI bus 112 at the data transmission speed S at the time of data writing by a tape drive. The data received by the internal buffer 33 is read at the writing speed R to a tape. The upper limit of the internal buffer use rate Uw at the time of tape writing is given as the upper limit of the timing, that is, the earliest timing when the tape drive 21 that has the highest bus use right priority makes a bus reconnect request. More specifically, (i) the tape drive 21 disconnect the SCSI bus 112 when the data amount in the internal buffer becomes full using the SCSI bus 112, (2) tape drives whose bus use right priorities are lower than that of the tape drive 21, that is the tape drive 22 and the tape drive 23, acquire a bus use right and use the SCSI bus 112 according to the priority order when the SCSI bus 112 is disconnected, (3) the internal buffer use rate of the tape drive 21 at the timing when the tape drive 23 having the last priority has just acquired the bus use right in this way, that is, at the timing when the tape drive 21 waited until all the tape drives except itself acquired a bus use right is determined as the upper limit of the internal buffer use rate Uw. If the tape drive 21 that has the highest bus use right priority makes a bus reconnect request at earlier timing than this upper limit, the internal buffers of the other tape drives that have lower bus use right priority such as the tape drive 23 may become empty because they cannot acquire the bus use right priority even if each tape drive makes a bus reconnect request when data in each tape drive reaches its internal buffer writing threshold.

Also, the lower limit of the internal buffer use rate Uw is given at the lower limit of the timing, that is the last timing when the tape drive 23 that has the lowest bus use right priority makes a bus reconnect request. More specifically, the internal buffer use rate Uw is the one at the timing when tape drive 23 is sure to store data amount to prevent its internal buffer 33 from becoming empty even if it continues data writing on a tape without receiving additional data supply from the SCSI bus 112 until the other tape drives that have higher bus use right priority than the tape drive 23 finish using the SCSI bus 112. The other tape drives mentioned above is the tape drive 21 and tape drive 22. If the tape drive 23 that has the last bus use right priority makes a bus reconnect request at later timing than this lower limit, its internal buffer 33 may become empty while the other tape drives, that is, the tape drive 21 and the tape drive 22, are using the SCSI bus 112.

Figure 5B:
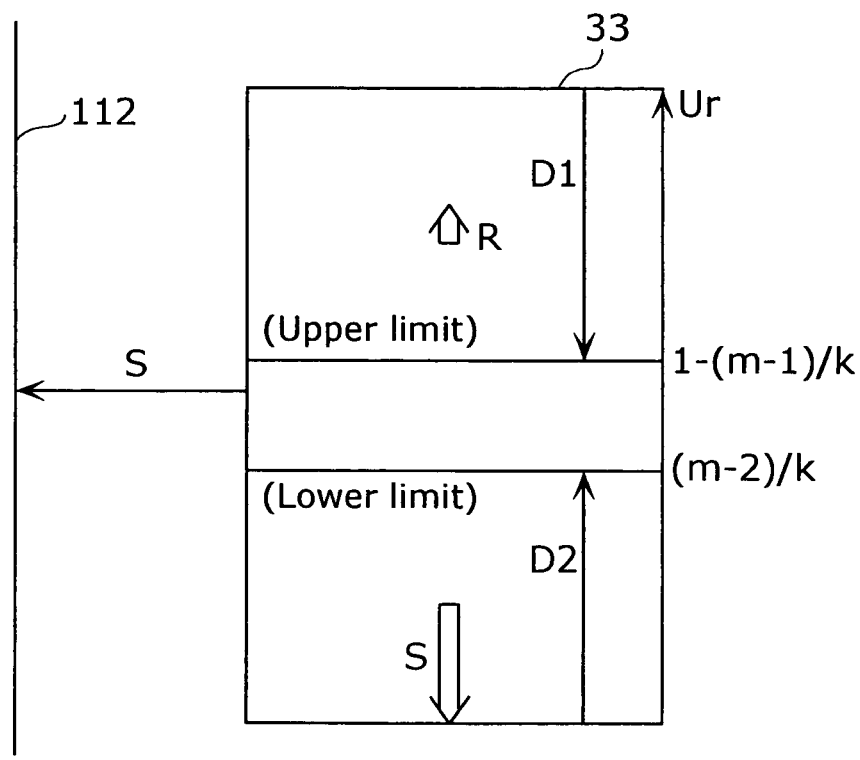
FIG. 5B is a diagram showing the upper and the lower limits of the internal buffer reading threshold of a tape drive using the internal buffer use rate Ur.

In the case of tape reading, the upper limit and the lower limit in the case of tape writing are reversed. FIG. 5B is a diagram showing the upper limit and the lower limit of the internal buffer reading threshold in the internal buffer 33 of a tape drive as the internal buffer use rate Ur. The internal buffer use rate Ur shows the remaining data amount stored in the internal buffer as a ratio to the capacity of the internal buffer when considering the capacity as 1. As shown in FIG. 5B, the data read from a tape at a reading speed R is stored in the internal buffer 33 at the time of data reading by a tape drive. Also, the data stored in the internal buffer 33 is sent from the SCSI bus 112 to outside at the data transmission speed S. This lower limit of the internal buffer reading threshold is given when the tape drive 21 that has the highest bus use right priority makes a bus reconnect request at its lower limit, that is, at the earliest timing. The internal buffer use rate is the one, in the case where the SCSI bus 112 is released and tape reading is started under the circumstance where the tape drive 21 uses the bus and the internal buffer 33 of the tape drive 21 becomes empty, at the timing when tape drives that have lower priorities than tape drive 21, that is the tape drive 22 and the tape drive 23 acquire the bus use right. If the tape drive 21 that has the highest bus use right priority makes a bus reconnect request at earlier timing than this lower limit, the internal buffers of the other tape drives that have lower bus use right priority such as the tape drive 23 may become full because they cannot acquire the bus use right priority even if each tape drive makes a bus reconnect request when data in each tape drive reaches the internal buffer reading threshold.

Also, the upper limit of the internal buffer reading threshold is given when the tape drive 23 that has the lowest bus use right priority makes a bus reconnect request at its upper limit, that is, the last timing. More specifically, the internal buffer use rate is the one at the timing when tape drive 23 is sure to keep empty space to prevent its internal buffer 33 from becoming full even if it continues data reading from a tape without sending additional data to the SCSI bus 112 until the other tape drives that have higher bus use right priority than the tape drive 23, that is, the tape drive 21 and tape drive 22 finishes using the SCSI bus 112. If the tape drive 23 that has the last bus use right priority makes a bus reconnect request at later timing than this upper limit, its internal buffer 33 may become full while the other tape drives, that is, the tape drive 21 and the tape drive 22, are using the SCSI bus 112.

In this way, having the respective tape drives make a bus reconnect request at the timing between the upper limit and the lower limit makes it possible to distribute the bus use right priority to tape drives 21 to 23 evenly and prevent data writing on a tape from being stopped caused by the internal buffer becoming empty or full.

The calculation methods of the internal buffer writing threshold and the internal buffer reading threshold by the respective tape drives 21 to 23 will be explained specifically below based on the above-mentioned bus access control method. First, the capacity of the respective internal buffers 33 in the respective tape drives 21 to 23 are the same "M" at the time of data writing on tapes, and T is the waiting time until data is read from the SCSI bus 112 at the buffer transmission speed S and the respective internal buffers 33 that are empty become full. Also, R is the speed when the respective heads 32 of the respective tape drives 21 to 23 read data from the internal buffers 33 and store the data on tapes. Each capacity M of the respective internal buffers is obtained from the formula "M=(S−R) T".

(Upper limit) The upper limit of the timing at which the tape drive 21 out of tape drives 21 to 23 connected with the SCSI bus 112 makes a bus reconnect request is immediately after the tape drives 22 and 23 other than the tape drive 21 acquires the bus use right after the tape drive 21 used the bus lastly. The time for the other tape drives to acquire a bus use right approximately equals to the total of the following three times, that is, the time for the respective tape drives to make a bus reconnect request and acquire the use right in a priority order, the time for data reading to the internal buffer via the bus and the time for disconnecting the bus. When the tape drive 21 tries to make a bus reconnect request after the last tape drive 23 that has the last bus use right priority acquires the bus use right, it must wait until the bus is disconnected. Also, the time for obtaining the bus use right after making the bus reconnect request and the time for disconnecting the bus are negligible because they are short compared to the time for reading data via the bus and writing the data in an internal buffer. Therefore, this waiting time "t" is the time for all the remaining empty tape drives except the two of the tape drive 21 and the tape drive 23 that has the last bus use right priority become full and "t" is obtained from the formula "t=(m−2)T". The data amount D1 read from the internal buffer 33 of the tape drive 21 that is full to the head 32 during this waiting time "t" is obtained from the formula "D1=(m−2)RT". The ratio of the read data amount D1 to the whole internal buffer 33 is obtained from the following formula: "D1/M=(m−2)RT/(S−R)T", where, "k=(S−R)/R", "D1/M=(m−2)/k". When representing the internal buffer use rate of the internal buffer that is full as "1" or that is empty as "0", the upper limit of the internal buffer use rate Uw is obtained from the formula "1−(m−2)/ k".

(Lower limit) The lower limit of the internal buffer use rate Uw that is the timing for making a bus reconnect request in the tape drive 23 having the last bus use right priority must be the timing that makes it possible to prevent the internal buffer 33 from becoming empty even if the tape drive 23 makes a bus reconnect request when the remaining data amount in the internal buffer 33 is D2 and then waits until the other tape drives, that is, the tape drive 21 and the tape drive 22, finishes using the SCSI bus 112. The waiting time "t" at this time is the time for making (m−1) numbers of empty tape drives except the tape drive 23 full in order using the SCSI bus 112 and "t" is obtained from the formula "t=(m−1)T". Therefore, the data amount read from the internal buffer 33 to the head 32 during the waiting time "t" is (m−1)RT. In other words, the remaining data amount D2 at the lower limit for the tape drive 23 having the last bus use right priority to make the bus reconnect request is obtained from the formula "D2=(m−1)RT". The ratio of this remaining data amount D2 to the whole internal buffer 33 is obtained from the formula "D2/M=(m−1)RT/(S−R)T". Here, as "k=(S−R)/R", the lower limit of the internal buffer use rate Uw is obtained from the formula "D2/M=(m−1)/k".

Therefore, in order to perform the above-mentioned control, the lower limit and the upper limit of the internal buffer use rate Uw must not be reversed, to put it another way using the above-mentioned two data amount, "D1+D2<M", that is, "(m−2)/k+(m−1)/k<1" must be set up. Therefore, the formula as the second prerequisite "2m−3<k" is obtained.

In the case of reading, "T" is the time for data being sent from the internal buffer 33 to the SCSI bus 112 at the buffer transmission speed S and the respective internal buffers 33 that are full becoming empty. Also, "R" is the speed for the respective heads 32 of the respective tape drives 21 to 23 read the data from tapes and write the data on the respective internal buffers 33. Each capacity M of the respective internal buffers is obtained from the formula "M=(S−R)T".

(Upper limit) The upper limit of the internal buffer use rate Ur that is the timing for making a bus reconnect request in the tape drive 23 having the last bus use right priority must be the timing that makes it possible to prevent the internal buffer 33 from becoming full even if the tape drive 23 makes a bus reconnect request when the remaining data amount in the internal buffer 33 is D1 and then waits until the other tape drives, that is, the tape drive 21 and the tape drive 22, finishes using the SCSI bus 112. The waiting time "t" at this time is the time for making (m−1) numbers of full tape drives except the tape drive 23 empty in order using the SCSI bus and "t" is obtained from the formula "t=(m−1)T". Therefore, the data amount stored in the internal buffer 33 during the waiting time "t" is (m−1)RT. In other words, the remaining data amount D1 at the upper limit for the tape drive 23 having the last bus use right priority to make the bus reconnect request is obtained from the formula "D1=(m−1) RT". The ratio of this remaining data amount D1 to the whole internal buffer 33 is obtained from the formula "D1/M=(m−1)RT/(S−R)T". Here, as "k=(S−R)/R", "D1/M= (m−1)/k". When representing the is internal buffer use rate of the internal buffer that is full as 1 or that is empty as 0, the upper limit of the internal buffer use rate Ur is obtained from the formula "1−(m−1)/k".

(Lower limit) The lower limit of the timing for the tape drive 21 out of tape drives 21 to 23 connected with the SCSI bus 112 to make a bus reconnect request is immediately after the tape drives 22 and 23 other than the tape drive 21 acquires the bus use right after the tape drive 21 used the bus lastly. The time for the other tape drives to acquire a bus use right approximately equals to the total of the following three times, that is, the time for the respective tape drives to make a bus reconnect request and acquire the use right in a priority order, the time for data reading from the internal buffer via the bus and sending the data to the SCSI bus 112 and the time for disconnecting the bus. As there is no need to wait until the last tape drive 23 finishes using the bus after the last tape drive 23 having the last bus use right priority acquires the bus use right, the tape drive 21 immediately makes a bus reconnect request. Also, the time for acquiring the bus use right after making the bus reconnect request and the time for disconnecting the bus are negligible because they are short compared to the time for reading data via the bus and writing the data in an internal buffer. Therefore, this waiting time "t" is the time for all the remaining full tape drives except the two of the tape drive 21 and the tape drive 23 having the last bus use right priority become empty and "t" is obtained from the formula "t=(m−2)T". The data amount D2 read from the head 32 of the tape drive 21 that is empty to the internal buffer 33 during this waiting time t is obtained from the formula "D2=(m−2)RT". The ratio of the read data amount D2 to the whole internal buffer 33 is obtained from the following formula: "D2/M=(m−2)RT/(S−R)T", where, "k= (S−R)/R", "D2/M= (m−2)/k".

In the case of reading, in order to perform the above-mentioned control, the lower limit and the upper limit of the internal buffer use rate Ur must not be reversed, to put it another way using the above-mentioned two data amount, "D1+D2<M", that is, "(m−2)/k+(m−1)/k<1" must be set up. Therefore, the formula as the second prerequisite "2m−3<k" is obtained.

As a result of the above check, when a group of parameters S, R and m satisfy the above-mentioned two prerequisites, the data access control unit 41 sets the internal buffer use rates Uw of the respective tape drives 21 to 23 as the internal buffer writing thresholds at ones within the range of "(m−1)/k≦Uw≦1−(m−2)/k". Also, it sets the internal buffer use rates Ur as the internal buffer reading thresholds at ones within the range of "(m−2)/k≦Ur≦1−(m−1)/k".

(internal buffer writing thresholds: internal buffer use rate Uw)

$$(m-1)/k \leq Uw \leq 1-(m-2)/k$$

(internal buffer reading thresholds: internal buffer use rate Ur)

$$(m-2)/k \leq Ur \leq 1-(m-1)/k$$

Here, as "k=5 (=(80−13)/13)" and "m=3", both of the first and the second prerequisites are satisfied. Therefore, the data access control unit 41 selects internal buffer writing thresholds from within the range of internal buffer use rates Uw "2/5≦Uw≦4/5". Also, it selects internal buffer reading thresholds from within the range of internal buffer use rates Ur "1/5≦Ur≦3/5". Note that access to the bus becomes frequent when setting the internal buffer writing thresholds at values near the upper limits or when setting the internal buffer reading thresholds near the lower limits, which leads to increasing the ratio of time for alterations (overhead) by reconnecting and disconnecting the bus to time for using the bus to the nonnegligible extent, in other words, the data transmission efficiency of the bus deteriorates. Therefore, here, medium values of the respective selection range such as the average value of the upper limit and the lower limit, for example, the internal buffer use rate Uw=3/5 as the internal buffer writing threshold and the internal buffer use rate Ur=2/5 as the internal buffer reading threshold (S203).

The data access control unit 41 sends the calculated internal buffer reading threshold and the internal buffer writing threshold to the respective control units 31 of the respective tape drives 21 to 23, and has the mode select commands control the bus reconnect timing of the respective tape drives 21 to 23 using the newly calculated internal buffer reading threshold and the internal buffer writing threshold from this time (S204).

After that, the data access control unit 41 processes the access data on receiving a request from the external PCs 5 to 7, executes access to the respective tape drives 21 to 23, and transmits data between storing devices of other computers and itself via LAN 2 storing the data in the memory 42 temporally (S205). If a group of parameters S, R and m do not satisfy the first or the second prerequisite in the step S201 or step S202, the data access control unit 41 processes the access requests without changing the preset internal buffer thresholds. Also, the processing finishes when the requested data transmission is finished (S206).

Writing and reading operations in the respective tape drives 21 to 23 when setting the internal buffer thresholds in this way are explained below.

Figure 6A:
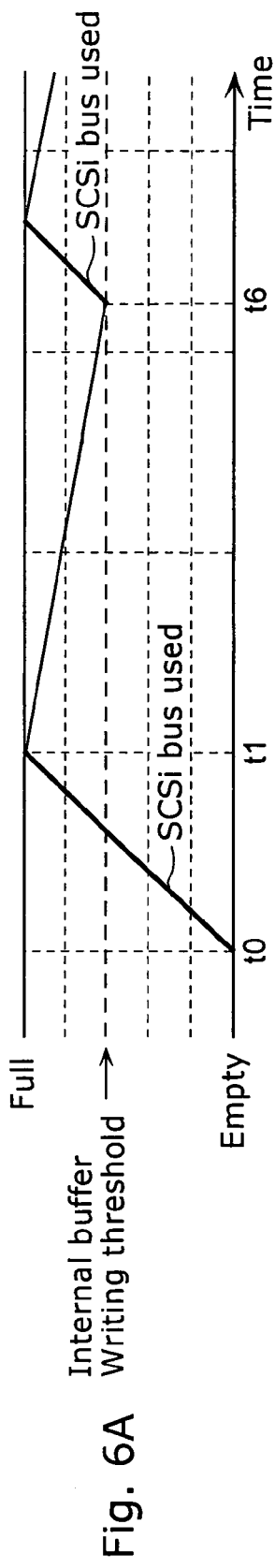
FIG. 6A shows temporal changes when the tape drive 21 writes data.
Figure 6B:
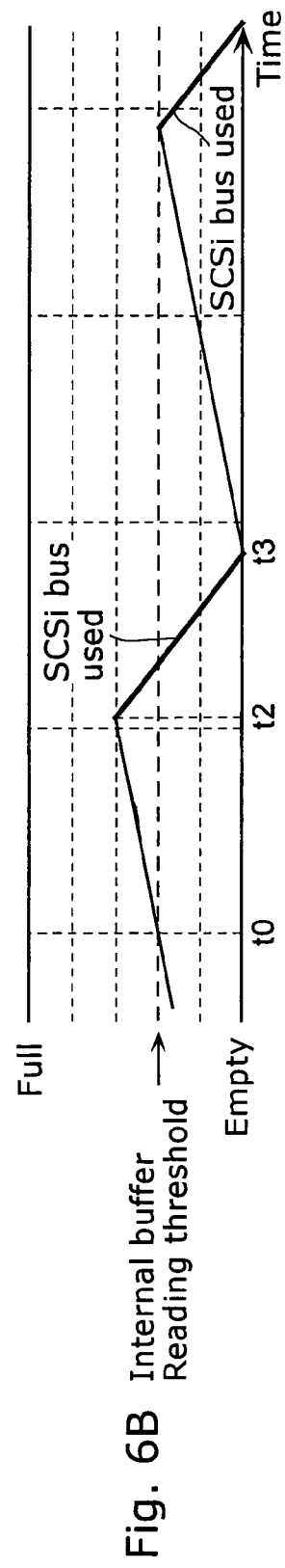
FIG. 6B shows temporal changes when the tape drive 22 reads data.
Figure 6C:
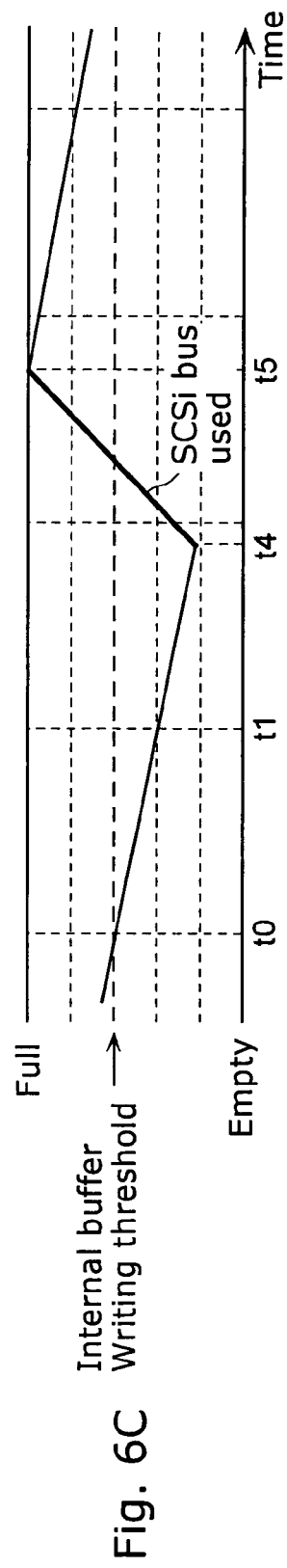
FIG. 6C shows temporal changes when the tape drive 23 writes data.

FIG. 6 is a graph showing temporal changes of the data amounts stored in the internal buffers 33 in the respective tape drives 21 to 23 shown in FIG. 3. FIG. 6A is a graph showing temporal changes of the data amount stored in the internal buffer 33 of the tape drive 21 at the time of data writing. FIG. 6B is a graph showing temporal changes of the data amount stored in the internal buffer 33 of the tape drive 22 at the time of data reading. FIG. 6C is a graph showing temporal changes of the data amount stored in the internal buffer 33 of the tape drive 23 at the time of data writing. In the same figure, for example, when focusing on the internal buffer 33 in the tape drive 23 shown in FIG. 6C, chances are high that the tape drive 23 can acquire the use right of the SCSI bus before the data in its internal buffer 33 underflows and receive additional data in its internal buffer 33 even when it cannot immediately acquire the use right of the SCSI bus 112 when the data reaches the internal buffer writing threshold at the time of data writing. Reasons are as follows: First, (i) the difference of (a) the data transmission speed between an internal buffer 33 and the SCSI bus 112 and (b) the data transmission speed between an internal buffer 33 and a tape and (ii) the number of tape drives 21 to 23 are determined so that tape drives 21 and 22 other than the tape drive 23 finish using the SCSI bus 112 before the internal buffer 33 of the tape drive 23 underflows even if tape drives 21 and 22 other than the tape drive 23 are continuously using the SCSI bus 112 for data writing or data reading under the first prerequisite, and second, the lower limit of the internal buffer writing threshold is predetermined like mentioned above.

In other words, as shown in FIG. 6A, while the time period of t0 to t1 needed for the tape drive 21 to transmit data between the host PC 4 and the internal buffer 33 using the SCSI bus 112, the data amount transmitted from the internal buffer 33 in the tape drive 23 to the tape during the time period of t0 to t1 is about (1/5 of the internal buffer capacity)+(error) at most. Also, as shown in FIG. 6b, in the time period of t2 to t3 needed for the tape drive 22 to transmit data between the host PC 4 and the internal buffer 33 using the SCSI bus 112, the data amount transmitted from the internal buffer 33 of the tape drive 23 to the tape during time t1 to t4 is also about (1/5 of the internal buffer capacity)+(error) as shown in FIG. 6C.

Also, selecting parameters m, S and R and determining the upper limit of the internal buffer writing thresholds like mentioned above in a way that both of the relation between (i) the difference of (a) the data transmission speed between an internal buffer 33 and the SCSI bus 112 and (b) the data transmission speed between an internal buffer 33 and a tape and (ii) the number of tape drives 21 to 23 satisfies the second prerequisite makes it possible to prevent tape drives 21 and 22 having a higher bus arbitration priority than the tape drive 23 that have already used the SCSI bus 112 from reaching their thresholds while the tape drive 23 is waiting for the use right of the SCSI bus, and thus chances become greater that the tape drive 23 acquires the use right of the SCSI bus and receives additional data in its internal buffer 33 before the data in the internal buffer 33 of the tape drive 23 underflows. In other words, as shown in FIG. 6B, as the data amount transmitted between the internal buffer 33 of the tape drive 21 and the tape in the tape drive 21 during the time period from when the tape drive 21 fully filed its internal buffer 33 (at the time t1) to when the tape drive 22 finishes using the SCSI bus 112 (at the time t3) is about (1/5 of the internal buffer capacity)+(error) at most as shown in FIG. 6A, the data amount in the internal buffer 33 of the tape drive 21 does not reach the internal buffer writing threshold until time t6 after t5 when the tape drive 23 finishes using the SCSI bus 112.

FIG. 7 is a graph showing temporal changes of the data amount stored in the internal buffer 33 in the respective tape drives 21 to 23 shown in FIG. 3. FIG. 7A is a graph showing temporal changes of the data amount stored in the internal buffer 33 when writing data in the tape drive 21. FIG. 7B is a graph showing the temporal changes of the data amount stored in the internal buffer 33 when writing data in the tape drive 22. FIG. 7C is a graph showing temporal changes of the data amount stored in the internal buffer 33 when reading data in the tape drive 23. Likewise, in reading, when focusing on the internal buffer 33 of the tape drive 23 shown in FIG. 7C, chances are high that the tape drive 23 acquires the use right of the SCSI bus use right before the data in the internal buffer 33 overflows and reads the data from the internal buffer 33 by taking into account the time for the other tape drives 21 to 22 to use the SCSI bus 112 for data writing or reading even when, for example, the data amount in the tape drive 23 reaches the internal buffer reading threshold and cannot acquire the use right of the SCSI bus immediately under the first prerequisite. For example, as shown in FIG. 7A, while the tape drive 21 transmits data between the host PC 4 and the internal buffer 33 (at the time t0 to t1), the data amount transmitted from the tape to the internal buffer 33 in the tape drive 23 is about (1/5 of the internal buffer capacity)+(error) at most. Therefore, even when the data amount in the internal buffer 33 at time t0 reaches the internal buffer reading threshold (2/5 of the internal buffer capacity), the data amount at time to is about 3/5 of the internal buffer capacity. In succession to that, in the case where the tape drive 22 acquires the use right of the SCSI bus 112, at time t3 when the tape drive 22 finishes using the SCSI bus 112, the data amount of the internal buffer 33 in the tape drive 23 is about 4/5 of the internal buffer capacity and thus there left enough time for allowing the tape drive 23 to become full.

Selecting parameter values m, S and R in a way that both of the relation between (i) the difference of (a) the data transmission speed between the internal buffer 33 and the SCSI bus 112 and (b) the data transmission speed between an internal buffer 33 and a tape and (ii) the number of tape drives 21 to 23 satisfies the second prerequisite makes it possible to prevent tape drives 21 and 22 having a higher bus arbitration priority that have already used the SCSI bus 112 from reaching their thresholds while the tape drive 23 is waiting for the use right of the SCSI bus during the time period of time t0 to t4, and thus chances become greater that the tape drive 23 acquires the use right of the SCSI bus and reads the data from its internal buffer before the data in the internal buffer 33 of the tape drive 23 overflows. For example, as shown in FIG. 7B, the data amount transmitted between the internal buffer 33 and the tape in the tape drive 21 is about (1/5 of the internal buffer capacity)+(error) at most when the tape drive 22 finishes using the SCSI bus (at the time t3) after starting using the SCSI bus (at the time t2). In other words, the data amount in the internal buffer 33 of the tape drive 21 is about 4/5 of the internal buffer capacity and does not reach the internal buffer writing threshold (3/5 of the internal buffer capacity). Therefore, chances are high that the timing for the tape drive 23 to acquire the use right of the SCSI bus 112 comes after the tape drive 21 and the tape drive 22 finish using the SCSI bus 112 in order.

As mentioned above, according to the first embodiment of the present invention, determining the internal buffer threshold taking into account the time for the other tape drives 21 to 22 to use the SCSI bus 112 for writing or reading even when the data amount of the tape drive 23 reaches the internal buffer threshold and cannot acquire the use right of the SCSI bus immediately under the circumstances where a plurality of the same drive units exist increases the chances that the tape drive 23 acquires the use right of the SCSI bus and transmits the data between the host PC 4 and itself before the data in the internal buffer of the tape drive 23 underflows or overflows. At the same time, as the internal buffer threshold that makes it possible to prevent the data amounts of the tape drives 21 to 22 having a higher bus arbitration priority that have already used the SCSI bus from reaching the threshold again while the tape drive 23 waits for the use right of the SCSI bus, and thus chances become greater that the tape drive 23 acquires the use right of the SCSI bus before the data in the internal buffer 33 of the tape drive 23 underflows or overflows.

In any case, even when a request for tape media transmission and the like is made to the media transmission system unit 25, there is no influence on the operations of the tape drives 21 to 23 because the media transmission system unit 25 usually processes a request when the SCSI bus 112 is released or disconnected.

Note that the host PC 4 (the data access control unit 41) may calculate the internal buffer writing threshold and the internal buffer reading threshold and set them for the respective tape drives as the need arises when the number of the operating tape drives can be dynamically changed, while the internal buffer writing threshold and the internal buffer reading threshold are calculated from the given tape drive information (m, S and R) before the host PC 4 starts processing the access request and the preset thresholds of the respective tape drives are changed using the mode select command in this embodiment.

Also, the tape library 3 may have a drive internal buffer threshold setting unit, and the drive internal buffer threshold setting unit may calculate the internal buffer writing threshold and the internal buffer reading threshold from the tape drive information (m, S and R), and the internal buffer threshold change instruction can be sent to the respective tape drives via the control line for maintenance or the like. Also, the respective control units 31 of the respective tape drives 21 to 23 may calculate its internal buffer writing threshold and its internal buffer reading threshold based on the tape drive information (m, S and R) given from outside.

The medium value (such as the average value of the upper limit and the lower limit) of the respective selection range (the lower limit and the upper limit of the internal buffer use rate) are selected as the internal buffer reading threshold and the internal buffer writing threshold in the above-mentioned embodiment 1, but the present invention is not limited to this and the internal buffer reading threshold and the internal buffer writing threshold are determined as the lower limit of the respective internal buffer use rates. In this case, the values that correctly match the respective lower values can be determined as the internal buffer reading threshold and the internal buffer writing threshold or values that approximately match the respective lower values can be determined as thresholds. For example, a bus reconnect request can be made when the internal buffer use rate approximately match the respective lower limits. Also, values that are obtained by adding predetermined minute values to the respective lower values can be determined as the thresholds. For example, values that are obtained by rounding up at the predetermined digit of the lower value of the internal buffer use rate can be determined as thresholds. Further, it is possible to calculate the average value of the upper limit and the lower limit on a temporary basis, and then the value obtained by averaging the calculated average value and the above-mentioned lower limit can be determined as the threshold.

Also, the case where the tape drive information (m, S and R) of the respective tape drives 21 to 23 are directly inputted to the data access control unit 41 from an operator via a keyboard of the host PC 4 is assumed here, but the present invention is not limited to this, and the data access control unit 41 may perform a test running of the tape library 3 previously and obtain the tape drive information (m, S and R) at the time. The above-mentioned variation is applicable in the following second embodiment 2 like in the first embodiment.

(Second Embodiment)

Figure 8:
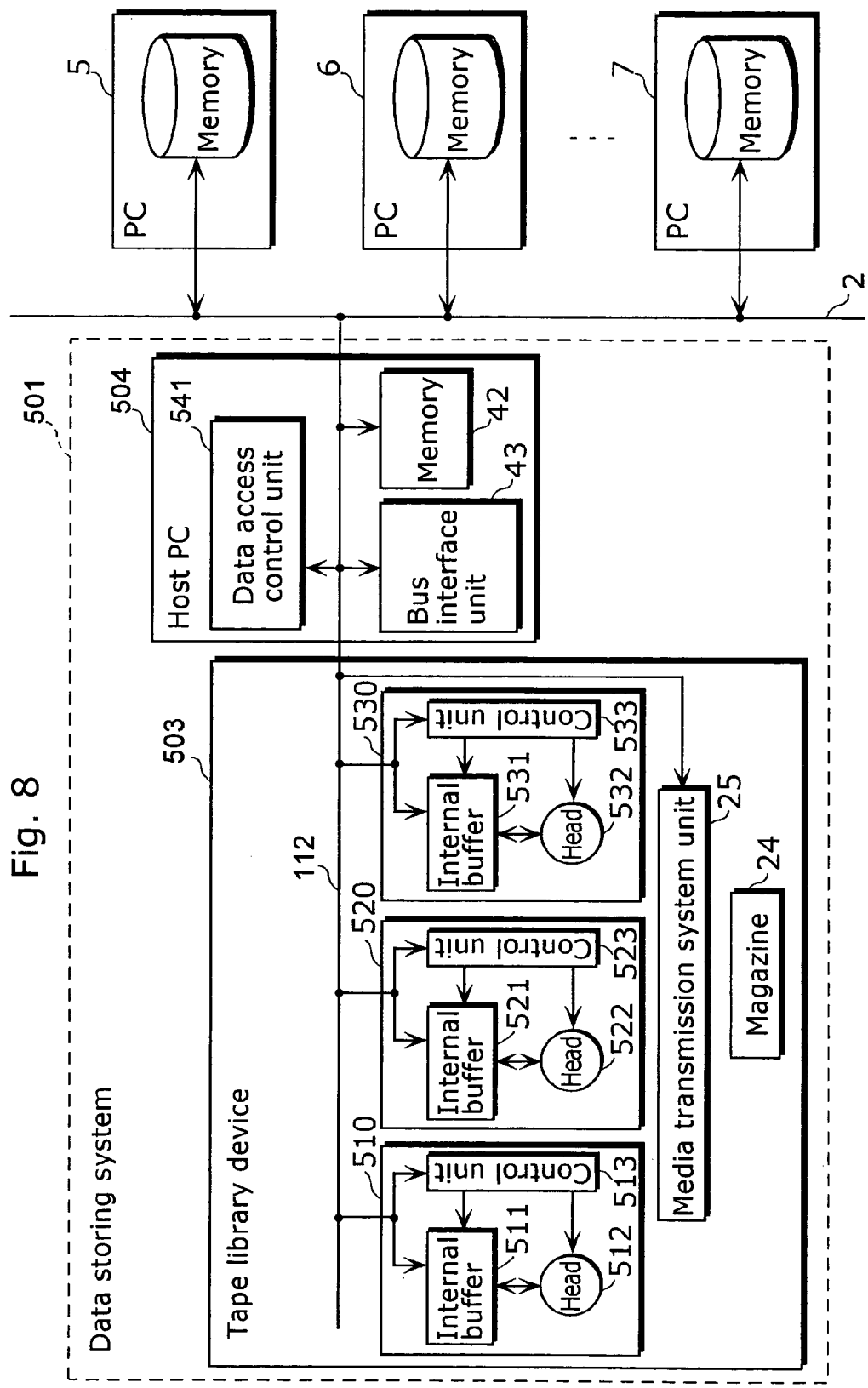
FIG. 8 is a block diagram showing the structure of the data storing system in the second embodiment.

FIG. 8 is a block diagram showing the structure of the data storing system 501 of the second embodiment. In the same figure, as to the same units as the data storing system 1 shown in FIG. 3, the same reference numbers are assigned to them and explanations for them are omitted. In the data storing system 501 of the second embodiment, the point that differs from the data storing system 1 of the first embodiment is that it has tape drives 510 to 530 that are different from each other in performance in the tape library. The data storing system 501 has a tape library 503 and a host PC 504 and is connected with other PC 5 to 7 that have a storing unit respectively via the LAN 2. The tape library 503 is connected with the host PC 504 (the data access control unit 541) via the SCSI bus 112 and has three (m=3) tape drives 510, 520 and 530 and the media transmission system unit 25. The tape drives 510, 520 and 530 receive an access request from the access control unit 541 and perform data reading from a tape or data writing on a tape. At this time, data transmission between the data access control unit 541 and the respective internal buffer 512, 522 and 532 is performed at the transmission rate of 80 megabytes per second (S=80)

via the SCSI bus. Also, a bus arbitration based on the SCSI ID numbers is performed according to the use right of the SCSI bus acquirement priorities as follows: first, the data access control unit 541; second, the tape drive 510; third, the tape drive 520, and lastly, the tape drive 530.

The tape drive 510 has an internal buffer 511, a head 512, and a control unit 513. The tape drive 510 has the internal buffer capacity of 12 megabytes (M1=12) and the reading speed from a tape or writing speed on a tape of the head 512, that is, the transmission rate between the internal buffer 511 and the tape is 10 megabytes per second (R1=10).

The tape drive 520 has an internal buffer 521, a head 522 and a control unit 523. The internal buffer 521 has an internal buffer capacity of 16 megabytes (M2=16) and the reading speed from a tape or writing speed on a tape of the head 522, that is, the transmission rate between the internal buffer 521 and the tape is 13 megabytes per second (R2=13).

The tape drive 530 has an internal buffer 531, a head 532 and a control unit 533. The internal buffer 531 has an internal buffer capacity of 16 megabytes (M3=16) and the reading speed from a tape or writing speed on a tape of the head 532, that is, the transmission rate between the internal buffer 531 and the tape is 16 megabytes per second (R3=16).

The respective control units 513, 523 and 533 of the respective tape drives 510, 520 and 530 disconnect the SCSI bus 112 when any of these internal buffers 511, 521 and 531 is going to underflow at the time of data reading and stops data transmission to the data access control unit 541 from the internal buffer 511, 521 and 531 until the data reaches the internal buffer reading threshold (the bus reconnect timing). If the SCSI bus 112 cannot be used at the bus reconnect timing and any of these internal buffers 511, 521 and 531 is going to overflow, the tape running is stopped to stop the tape reading.

Also, when the internal buffer 511, 521 or 531 is going to overflow at the time of data writing, the SCSI bus 112 is disconnected and the data transmission to the internal buffer 511, 521 or 531 from the data access control unit 541 is stopped until the data reaches the internal buffer writing threshold (the bus reconnect timing). If the SCSI bus 112 cannot be used at the bus reconnect timing and any of these internal buffers 511, 521 and 531 is going to underflow, the tape is stopped to stop the tape writing. These internal buffer thresholds of the tape drives 510, 520 and 530 are variable and it is possible to change the internal buffer writing thresholds and the internal buffer reading thresholds by sending an internal buffer threshold change request (mode select command) from the data access control unit 541 to the tape drives 510, 520 and 530.

The host PC 504 comprises a data access control unit 541, a memory 42 and a bus interface unit 43. The host PC 504 calculates the internal buffer writing thresholds and the internal buffer reading thresholds in the tape drives 510, 520 and 530 that are different in performance in the tape library 503, sets the calculated internal buffer writing thresholds and the internal buffer reading thresholds to the respective tape drives 510, 520 and 530, sends an access request to the predetermined tape drive upon receiving a request from the external PCs 5 to 7, and executes data transmission between the external PCs 5 to 7 and the storing device via LAN 2. The data access control unit 541 calculates the capacity of the internal buffers 511, 521 and 531, the reading and writing speed and the like of the heads 512, 522 and 532, and the internal buffer writing thresholds and the internal buffer reading thresholds of the three tape drives that differ from each other in performance.

In the data storing system 501 that is formed as mentioned above, the data access control unit 541 operates like the following explanations. FIG. 9 is an association table showing the relation of the respective parameters of the tape drives 510, 520 and 530. FIG. 10 is a flow chart showing the bus reconnect timing setting operation of the tape drives 510, 520 and 530 by the data access control unit 541 shown in FIG. 8.

The data access control unit 541 checks (S701) that the first prerequisite "$\Sigma Ri=R<S$" meaning that the total (R) of "Ri"s is smaller than S is satisfied before starting the processing of the access request to the tape drives 510, 520 and 530 based on parameters S (the data transmission speed of the SCSI bus 112) of the tape drives 510, 520 and 530 and Ri (the data writing speed on a tape or data reading speed from a tape in "i" th tape drive 510, 520 or 530, where "i" is a natural number that exists in the range of "$1 \leq i \leq 3$" and the tape drives 510, 520 and 530 correspond to these natural numbers from 1 to 3 respectively in ascending order). This first prerequisite is a condition for giving the respective tape drives a SCSI bus use right in rough order according to the bus priorities like the case of the first embodiment. When the above-mentioned first prerequisite is satisfied, in addition, the data access control unit 541 checks (S702) that the second prerequisite "$\{(\Sigma Ti)-Ti\}\cdot Ri<Mi$" as to each "i". This second prerequisite is a formula showing the prerequisite that the capacity Mi of the "i" th tape drive having the last bus priority is bigger than the lower limit of the internal buffer writing threshold. The lower limit of the internal buffer writing threshold shown in the first embodiment is the timing that makes it possible to prevent the data amount in the internal buffer from becoming "0" even when the "i" th tape drive must wait until the other tape drives having a higher priority finish using the bus after making the bus reconnect request. The "i" th tape drive may have to wait for the conceivable longest waiting time T after the data reaches the internal buffer writing threshold in the worst case, and T is obtained from the following formula "$T=(\Sigma Ti)-Ti$ (where, $1 \leq i \leq 3$)". Note that time Ti is the time needed for changing the internal buffer from empty to full when the data is read from the bus at the data transmission speed S and written on the tape at the transmission speed Ri in the "i" th tape drive. In other words, the capacity Mi of the internal buffer of the "i" th tape drive is obtained from "$Mi=(S-Ri) Ti$". Also, data amount read from the internal buffer of the "i" th tape drive during this waiting time T is RiT. Based on the above-mentioned second prerequisite, capacity Mi of the internal buffer of the "i" th tape drive must be bigger than the data amount RiT read from the internal buffer of the tape drive during the waiting time T. In other words, the formula "$RiT<Mi$" must be satisfied. Developing this formula gives us "$Ri(\Sigma Ti)-RiTi<Mi$" and the above-mentioned formula of the second prerequisite. When the above-mentioned second prerequisite is satisfied, the data access control unit 541 checks (S703) the third prerequisite "$\{(\Sigma Ti)-Ti\}Ri+\{(\Sigma Ti)-(Ni+Ti)\}\cdot Ri<Mi$" as to each "i" when determining the smallest value of the respective times "Ti"s of the tape drives 510, 520 and 530 except time Ti of the "i" th tape drive as "Ni". The third prerequisite is a formula showing the prerequisite that "i" th tape drive has the data capacity Mi that makes it possible to prevent the upper limit and the lower limit of the internal buffer writing thresholds from reversing. In this formula, "$\{(\Sigma Ti)-(Ti+Ti)\}Ri$" is the data amount read from the buffer by the upper limit timing of the internal buffer writing threshold in the "i" th tape drive. Also, "$\{(\Sigma Ti)-Ti\}Ri$" is the remaining data amount corresponding to the lower limit of the internal buffer writing threshold in the "i" th tape drive as mentioned earlier. When the respective tape drives 510 to 530 differ from each other in performance like the data storing system 501 of the second embodiment, the lower limit of the internal buffer reading threshold is set at "$\{(\Sigma Ti)-(Ni+Ti)\} \cdot Ri/Mi$" and the upper limit of the internal buffer writing threshold is set at "$1-\{(\Sigma Ti)-(Ni+Ti)\} \cdot Ri/Mi$", both of which mean that the "i" th tape drive waits until the last tape drive acquires the bus use right even when a tape drive capable of changing its internal buffer from full to empty and vice versa for a briefest time except the "i" th tape drive is the tape drive that acquires the bus use right lastly, in other words, even when a tape drive that requires more time to change the internal buffer from full to empty and vice versa acquires the bus use right prior to the "i" th tape drive. Also, the reason why the lower limit of the internal buffer reading threshold is set at "$\{(\Sigma Ti)-(Ni+Ti)\} \cdot Ri/Mi$" and the upper limit of the internal buffer writing threshold is set at "$1-\{(\Sigma Ti)-(Ni+Ti)\} \cdot Ri/Mi$" from the view point of data transmitting efficiency of the SCSI bus 112 is because it is better to consider the worst case senario.

Next, the data access control unit 541 sets the range of the internal buffer writing threshold of the "i" th tape drive specifying the internal buffer use rate as "$\{(\Sigma Ti)-Ti\} \cdot Ri/Mi$ or more" and "$1-\{(\Sigma Ti)-(Ni+Ti)\} \cdot Ri/Mi$ or less" when the respective parameters satisfy all the above-mentioned prerequisites. It also sets the range of the internal buffer reading threshold of the "i" th tape drive specifying the internal buffer use rate as "$\{(\Sigma Ti)-(Ni+Ti)\} \cdot Ri/Mi$ or more" and "$1-\{(\Sigma Ti)-Ti\} \cdot Ri/Mi$ or less".

In this case, as shown in FIG. 9, as "$\Sigma Ri=39$" and "$\Sigma Mi=44$", and the tape drive 510's parameters "$M1=12$", "$R1=10$", "$(T2+T3) \cdot R1+T3 \cdot R1=7.38$" and "$N1=16/67$" satisfy all the above-mentioned prerequisites, the internal buffer writing threshold of the tape drive 510 is selected from the range of "$0.40 \leq Uw1 \leq 0.79$" specifying the internal buffer use rate as Uw1. Also, the internal buffer reading threshold is selected from the range of "$0.21 \leq Ur1 \leq 0.6$" specifying the internal buffer use rate as Ur1.

Likewise, as the tape drive 520's parameters "$M2=16$", "$R2=13$", "$(T1+T3) \cdot R2+T3 \cdot R2=8.72$" and "$N2=12/70$" satisfy all the above-mentioned prerequisites, the internal buffer writing threshold of the tape drive 520 is selected from the range of "$0.34 \leq Uw2 \leq 0.79$" considering the internal buffer use rate as Uw2. Also, the internal buffer reading threshold is selected from the range of "$0.21 \leq Ur2 \leq 0.66$" considering the internal buffer use rate as Ur2.

Also, as the tape drive 530's parameters "$M3=16$", "$R3=16$", "$(T1+T2) \cdot R3+T2 \cdot R3=10.38$" and "$N3=12/70$" also satisfy all the above-mentioned prerequisites, the internal buffer writing threshold of the tape drive 530 is selected from the range of "$0.41 \leq Uw3 \leq 0.76$" considering the internal buffer use rate as Uw3. Also, the internal buffer reading threshold is selected from the range of "$0.24 \leq Ur3 \leq 0.59$" considering the internal buffer use rate as Ur3. Here, respective medium values are selected (S704) as follows: (tape drive 510) Internal buffer writing threshold is determined as "internal buffer use rate Uw1=0.59", and internal buffer reading threshold is determined as "internal buffer use rate Ur1=0.40". (tape drive 520) Internal buffer writing threshold is determined as "internal buffer use rate Uw2=0.56", and internal buffer reading threshold is determined as "internal buffer use rate Ur2=0.43". (tape drive 530) Internal buffer writing threshold is determined as "internal buffer use rate Uw3=0.58", and internal buffer reading threshold is determined as "internal buffer use rate Ur3=0.41".

The data access control unit 541 sets the internal buffer writing threshold and internal buffer reading threshold selected as mentioned above to the respective tape drives 510, 520 and 530 (S 705) using the mode select command. After that, the data access control unit 541 executes access to the tape drives 510, 520 and 530 processing access requests and executes data transmission (S706) between the storing devices of the external PCs 5 to 7 and itself via LAN 2 storing the data on memory 44 temporally. In this case, like the first embodiment, when the SCSI bus 112 and parameters of the respective tape drives 510, 520 and 530 do not satisfy any of the first to the third prerequisites, the data access control unit 541 processes access requests without setting new internal buffer writing thresholds and the internal buffer reading thresholds and executes data transmission between the storing devices of the external PCs 5 to 7 and itself. Also, the processing finishes (S707) when the requested data transmission is finished.

Figure 11A:
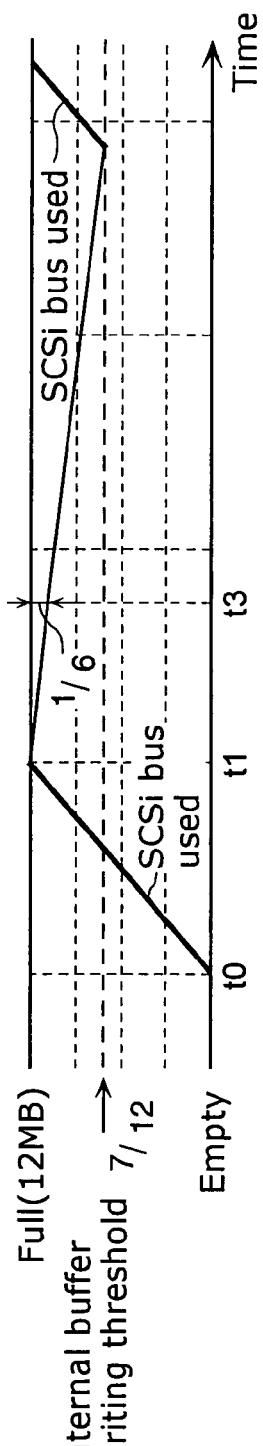
FIG. 11A shows temporal changes when the tape drive 510 writes data.
Figure 11B:
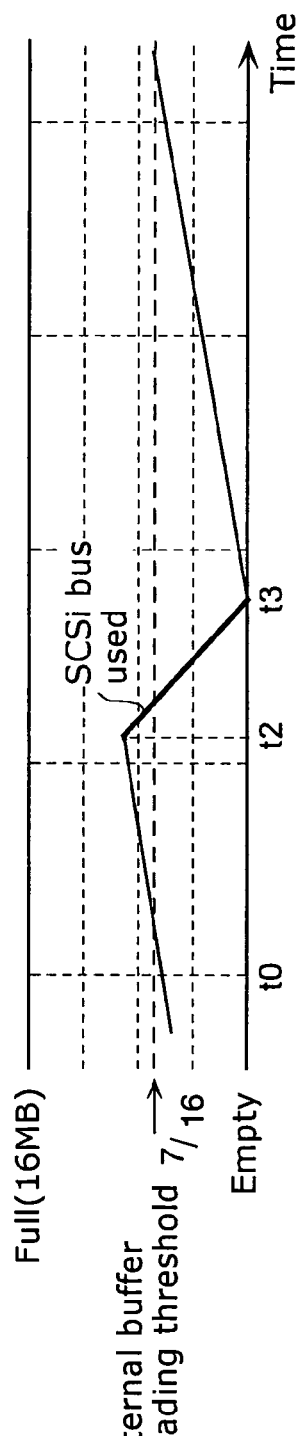
FIG. 11B shows temporal changes when the tape drive 520 reads data.
Figure 11C:
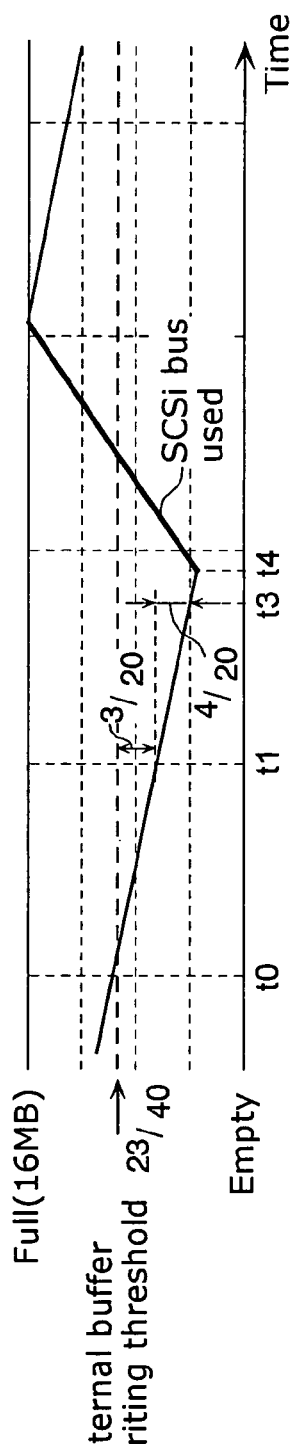
FIG. 11C shows temporal changes when the tape drive 530 writes data.

The writing or reading operations of the tape drives 510, 520 and 530 when setting the internal buffer thresholds as mentioned above are explained next. FIG. 11 is a graph showing temporal changes of the data amount stored in the internal buffers 511, 521 and 531 in the respective tape drives 510, 520 and 530 shown in FIG. 8. FIG. 11A is a graph showing temporal changes of the data amount stored in the internal buffer 511 at the time of data writing in the tape drive 510. FIG. 11B is a graph showing temporal changes of the data amount stored in the internal buffer 521 at the time of data reading in the tape drive 520. FIG. 11C is a graph showing temporal changes of the data amount stored in the internal buffer 531 of the stored data amount at the time of data writing in the tape drive 530.

In writing, as the data access control unit 541 takes into account the time for the other tape drives 510 and 520 to use the SCSI bus 112 for data writing or data reading according to the first and the second prerequisites, chances are high that the tape drive 530 having the last priority in the bus arbitration can acquire the use right of the SCSI bus before the data in its internal buffer 531 of the tape drive 530 underflows and receive additional data in its internal buffer 531 even when, for example, it cannot immediately acquire the use right of the SCSI bus 112 when the data reaches the internal buffer writing threshold.

For example, while the tape drive 510 transmits data between the host PC 504 and its internal buffer 511 (at the time t0 to t1), the data amount transmitted from the internal buffer 531 to the tape in the tape drive 530 is about "$Ti \cdot R3$ of the internal buffer capacity/M3= 17% plus some error" at most. Also, while the tape drive 520 transmits data between the host PC 504 and its internal buffer 521 (at the time t2 to t3), the data amount transmitted from the internal buffer 531 to the tape in the tape drive 530 is about "$T2 \cdot R3/M3=24\%$ plus some error". Therefore, the tape drive 530 having the last priority in the bus arbitration can continue data writing on the tape without underflow although its data amount reaches the internal buffer writing threshold at time t0 until the other tape drives whose priorities are higher than that of the tape drive 530 finish using the SCSI bus 112 (at the time t4).

At the same time, as tape drives 510 to 520 that have a high bus arbitration priority do not reach the internal buffer writing threshold again while the tape drive 530 waits for the use right of the SCSI bus because the data access control unit 541 determines the third prerequisite and the upper limit of the internal buffer writing threshold as mentioned above, chances become greater that the tape drive 530 can acquire the use right of the SCSI bus and receive additional data in its internal buffer 531 before the data in the internal buffer 531 underflows.

For example, the data amount transmitted between the internal buffer 511 and the tape in the tape drive 510 when the tape drive 520 finishes using the SCSI bus 112 (at the time t3) is about "T2·R1 of the internal buffer capacity/ M1=20% plus some error". Therefore, the tape drive 530 can receive additional data in the internal buffer 531 immediately because the tape drive 510 do not acquire the use right of the SCSI bus again after the tape drive 520 finishes using the SCSI bus 112 until the tape drive 530 having the next priority finishes using the SCSI bus 112.

FIG. 12 is a graph showing temporal changes of the data amount stored in the internal buffers 511, 521 and 531 in the respective tape drives 510, 520 and 530 shown in FIG. 8. FIG. 12A is a graph showing temporal changes of the data amount stored in the internal buffer 511 at the time of data writing in the tape drive 510. FIG. 12B is a graph showing temporal changes of the data amount stored in the internal buffer 521 at the time of data writing in the tape drive 520. FIG. 12C is a graph showing temporal changes of the data amount stored in the internal buffer 531 at the time of data reading in the tape drive 530.

In reading, as the data access control unit 541 takes into account the time for the other tape drives 510 and 520 to use the SCSI bus 112 for data writing or data reading according to the first and the second prerequisites, chances are high that the tape drive 530 can acquire the use right of the SCSI bus before the data in its internal buffer 531 overflows and reads the data from its internal buffer even when, for example, it cannot immediately acquire the use right of the SCSI bus 112 when the data reaches the internal buffer reading threshold.

For example, the data amount transmitted from the tape to the internal buffer 531 in the tape drive 530 while the tape drive 510 is transmitting the data between the host PC 504 and its internal buffer 511 (at the time t0 to t1) is about "internal buffer capacity T1·R3/M3=17% plus some error" at most, the data amount transmitted from the tape to the internal buffer 531 in the tape drive 530 while the tape drive 520 is transmitting the data between the host PC 504 and its internal buffer 521 (at the time t2 to t3) is "the internal buffer capacity T2·R3/M3=24% plus some error". Therefore, the tape drive 530 can continue data reading from the tape without data overflow of the internal buffer 531 until time t4 when acquiring the use right of the SCSI bus 112.

At the same time, as tape drives 510 and 520 having a high bus arbitration priority that have already used the SCSI bus 112 do not reach the internal buffer writing threshold again while the tape drive 530 waits for the use right of the SCSI bus because the data access control unit 541 determines the third prerequisite and the upper limit of the internal buffer writing threshold as mentioned above, chances become greater that the tape drive 530 can immediately acquire the use right of the SCSI bus and reads the data from its internal buffer 531 before the data in the internal buffer 531 of the tape drive 530 overflows. For example, the data amount transmitted between its internal buffer 511 and the tape in the tape drive 510 from the time when the tape drive 520 starts using the SCSI bus 112 (at the time t2) to the time when it finishes using it (at the time t3) is about "the internal buffer capacity "T2·R1/M1=20%" plus some error" at most. In this way, the tape drive 530 can acquire the use right of the SCSI bus 112 according to the bus arbitration priorities for the SCSI bus 112 and read the data from its internal buffer 531 before the data in the internal buffer 531 overflows.

As mentioned up to this point, according to the second embodiment of the present invention, even when the data in the tape drive 530 reaches the internal buffer threshold and the tape drive 530 cannot acquire the use right of the SCSI bus under the circumstance where a plurality of drive units different in internal performance coexist, chances are high that the tape drive 530 can acquire the use right of the SCSI bus and transmit data between the data access control unit 541 and itself before the data in the internal buffer of the tape drive 530 underflows or overflows by taking into account the time for the other tape drives 510 and 520 to use the SCSI bus 112 for data writing or reading when determining the internal buffer thresholds. At the same time, as the internal buffer thresholds are determined preventing the tape drives 510 and 520 having a high bus arbitration priority that have already used the SCSI bus 112 from reaching the thresholds again while the tape drive 530 is waiting for acquiring the use right of the SCSI bus, chances become greater that the tape drive 530 can acquire the use right of the SCSI bus before the data in the internal buffer of the tape drive 530 underflows or overflows.

Explanation is made selecting a drive unit as the tape drive in this embodiment of the present invention, but the present invention is not limited to this, and it is effective in streamlining the transmission in the case of an optical disc drive where an optical disc drive such as a CD, a DVD or the like is used as a storing medium. Also, the present invention can apply for a magnetic disc drive.

The present invention is usable as a data storing system for storing data on a tape, an optical disc or a magnetic disc using a plurality of tape drives, optical disc drives or magnetic disc drives that are connected with a bus such as the SCSI bus in parallel. The present invention is also usable, in these data storing systems, as a bus access control device for controlling the bus access of the respective drive units such as a tape drive, an optical disc drive, a magnetic disc drive or the like and the bus access control method. Further, it is also usable as a program for having a computer execute the bus access control method like this and a storing medium where the program is stored.

What is claimed is:

1. A data storing system comprising:
a plurality of drive units for writing data transmitted via a bus on a storing media and reading data from a storing media and transmitting the data via the bus in parallel; and
a transmission control device for controlling data transmission made by each of said plurality of drive units respectively,
wherein the transmission control device includes:
a bus control unit operable to give a bus use right responding to a request for a bus use right made by the respective drive units according to predetermined rules;
a request threshold calculation unit operable to calculate a request threshold showing a timing at which the respective drive units request the bus use right based on the number of the drive units, a data transmission speed of the bus and either a data reading speed or a data writing speed of the respective drive units; and
a request threshold notification unit operable to notify the respective drive units of the calculated request threshold, and
the respective drive units include:
a buffer for storing data transmitted between the storing medium and the bus temporally;

a recording head for reading the data from the storing medium so as to store the data in the buffer and read the data from the buffer so as to write the data on the storing medium; and a control unit for requesting and acquiring the bus use right and transmit the data between the buffer and the bus when data amount in the buffer increases or decreases to the notified request threshold.

2. The data storing system according to claim 1, wherein the request threshold calculation unit includes a reading threshold calculation unit operable to calculate reading thresholds which are the request thresholds at the time of data reading in the respective drive units so that the thresholds make it possible to prevent data in the buffer from overflowing even when one of the drive units that has already made a request for the bus use right waits until the other drive units finish data transmission using the bus based on the number of the drive units, the data transmission speed of the bus and the data reading speed from the storing medium, the request threshold notification unit notifies the respective drive units of the calculated reading thresholds as the request thresholds at the time of data reading, the recording head reads data from the storing medium so as to store the data in the buffer, and the control unit requests and acquires the bus use right and sends the data from the buffer to the bus when the data amount in the buffer increases and reaches the notified reading threshold.

3. The data storing system according to claim 2, wherein the reading threshold calculation unit calculates the reading thresholds that satisfy "the buffer use rate $\leq 1-(m-1)/k$", when mR<S on condition that the respective drive units have the same data reading speed from the storing medium and the same buffer storage capacity, where, "m" is the number of drive units ("m" is a natural number), "R" is a data reading speed from the storing medium, "S" is a data sending speed from the buffer to the bus, "k" is a speed ratio "(S−R)/R" ("k" is a natural number).

4. The data storing system according to claim 3, wherein the bus control unit arbitrates the bus use right according to priorities of the bus use right based on the ID numbers of the respective drive units, the reading threshold calculation unit further calculates the reading thresholds that satisfy "the buffer use rate $\geq (m-2)/k$", when the speed ratio "k" and the number of the drive units "m" satisfy "k>(2m−3)".

5. The data storing system according to claim 4, wherein the reading threshold calculation unit further includes a warning unit operable to issue a warning that it is impossible to calculate the reading threshold when the speed ratio "k" and the number of the drive units "m" do not satisfy "k>(2m−3)".

6. The data storing system according to claim 4, wherein the reading threshold calculation unit calculates the reading threshold which is an average value of the upper limit of the buffer use rate "1−(m−1)/k" and the lower limit of the buffer use rate "(m−2)/k".

7. The data storing system according to claim 4, wherein the reading threshold calculation unit calculates the reading threshold which is a lower limit of the buffer use rate "(m−2)/k".

8. The data storing system according to claim 4, wherein the reading threshold calculation unit calculates the reading threshold which is a value obtained by adding a predetermined value to the lower limit of the buffer use rate "(m−2)/k".

9. The data storing system according to claim 4, wherein the number of the drive units "m" is the number of operating drive units in the plurality of drive units connected with the bus.

10. The data storing system according to claim 3, wherein the number of the drive units "m" is the number of operating drive units in the plurality of drive units connected with the bus.

11. The data storing system according to claim 2, wherein drive units different in performance are included in the plurality of drive units (the number of drive units: m), and the reading threshold calculation unit calculates the reading threshold of the "i" th ("$1 \leq i \leq m$": "i" is a natural number) drive unit satisfying "the buffer use rate $\leq 1-\{(\Sigma Ti)-Ti\} \cdot Ri/Mi$" on condition that each "i" satisfies "$\{(\Sigma Ti)-Ti\} \cdot Ri<Mi$", when ""Ri"s in total<S", where, in the "i" th drive unit, "Mi" is the buffer storing capacity, "Ri" is a data reading speed from the storing medium, "S" is a data sending speed from the buffer to the bus, time needed for changing the buffer from full to empty is "Ti=Mi/(S−Ri)".

12. The data storing system according to claim 11, wherein the bus control unit arbitrates the bus use right according to priorities of the bus use right based on ID numbers of the respective drive units, the reading threshold calculation unit calculates the reading threshold of the "i" th drive unit satisfying "the buffer use rate $\geq \{(\Sigma Ti)-(Ni+Ti)\} \cdot Ri/Mi$", when the Ti, the Ni and the Ri satisfy "$\{(\Sigma Ti)-Ti\} \cdot Ri+\{(\Sigma Ti)-(Ni+Ti)\} \cdot Ri<Mi$" as to each "i", where, the smallest value except time Ti of the "i" th drive unit in "Ti"s of the respective drive units as Ni.

13. The data storing system according to claim 12, wherein the reading threshold calculation unit further comprises a warning unit operable to issue a warning that it is impossible to calculate the reading threshold when the Ti, the Ni and the Ri do not satisfy "$\{(\Sigma Ti)-Ti\} \cdot Ri+\{(\Sigma Ti)-(Ni+Ti)\} \cdot Ri<Mi$".

14. The data storing system according to claim 1, wherein the request threshold calculation unit includes a writing threshold calculation unit operable to calculate the writing thresholds which are the request thresholds at the time of data writing in the respective drive units so that the thresholds make it possible to prevent data in the buffer from underflowing even when one of the drive units that has already made a request for the bus use right waits until the other drive units finish data transmission using the bus based on the number of the drive units, the data transmission speed of the bus and the data writing speed on the storing medium, the request threshold notification unit notifies the respective drive units of the calculated writing thresholds as the request thresholds at the time of data writing, the recording head reads data from the buffer so as to write the data on the storing medium, and the control unit requests and acquires the bus use right and sends the data from the bus to the buffer when data amount in the buffer decreases and reaches the notified writing threshold.

15. The data storage system according to claim 14,
wherein the writing threshold calculation unit calculates the writing thresholds that satisfy "the buffer use rate≧(m−1)/k",
when mR<S on condition that the respective drive units have the same data writing speed on the storing medium and the same buffer storage capacity,
where, "m" is the number of drive units ("m" is a natural number), "R" is a data writing speed on the storing medium, "S" is a data acquiring speed from the bus to the buffer, "k" is a speed ratio "(S−R)/R" ("k" is a natural number).

16. The data storing system according to claim 15,
wherein the bus control unit arbitrates the bus use right according to priorities of the bus use right based on the ID numbers of the respective drive units,
the writing threshold calculation unit further calculates the writing thresholds that satisfy "the buffer use rate≦1−(m−2)/k", when the speed ratio "k" and the number of drive units "m" satisfy "k>(2m−3)".

17. The data storing system according to claim 16,
wherein the writing threshold calculation unit further comprises a warning unit operable to issue a warning that it is impossible to calculate the writing threshold when the speed ratio "k" and the number of drive units "m" do not satisfy "k>(2m−3)".

18. The data storing system according to claim 16,
wherein the writing threshold calculation unit calculates the writing threshold which is an average value of the upper limit of the buffer use rate "1−(m−2)/k" and the lower limit of the buffer use rate "(m−1)/k".

19. The data storing system according to claim 16,
wherein the writing threshold calculation unit calculates the writing threshold which is a lower limit of the buffer use rate "(m−1)/k".

20. The data storing system according to claim 16,
wherein the writing threshold calculation unit calculates the writing threshold which is a value obtained by adding a predetermined value to the lower limit of the buffer use rate "(m−1)/k".

21. The data storing system according to claim 16,
wherein the number of the drive units "m" is the number of operating drive units in the plurality of drive units connected with the bus.

22. The data storing system according to claim 15,
wherein the number of the drive units "m" is the number of operating drive units in the plurality of drive units connected with the bus.

23. The data storing system according to claim 14,
wherein drive units different in performance are included in the plurality of drive units (the number of drive units: m), and the writing threshold calculation unit calculates the writing threshold of the "i" th ("1≦i≦m": "i" is a natural number) drive unit satisfying "the buffer use rate≧{(ΣTi)−Ti}·Ri/Mi" on condition that each "i" satisfies "{(ΣTi)−Ti}·Ri<Mi",
when ""Ri"s in total<S",
where, in the "i" th drive unit, "Mi" is the buffer storage capacity, "Ri" is a data writing speed on the storing medium, "S" is a data acquiring speed from the bus to the buffer, time needed for changing the buffer from empty to full is "Ti=Mi/(S−Ri)".

24. The data storing system according to claim 23,
wherein the bus control unit arbitrates the bus use right according to priorities of the bus use right based on ID numbers of the respective drive units,
the writing threshold calculation unit calculates the writing threshold of the "i" th drive unit satisfying "the buffer use rate≦1−{(ΣTi)−(Ni+Ti)}·Ri/Mi",
when the Ti, the Ri and the Ni satisfy "{(ΣTi)−Ti}·Ri+{(ΣTi)−(Ni+Ti)}·Ri<Mi" as to each "i",
where, the smallest value except time Ti of the "i" th drive unit in "Ti"s of the respective drive units as Ni.

25. The data storing system according to claim 24,
wherein the writing threshold calculation unit further includes a warning unit operable to issue a warning that it is impossible to calculate the writing threshold when the Ti, the Ri and the Ni do not satisfy "{(ΣTi)−Ti}·Ri+{(ΣTi)−(Ni+Ti)}·Ri<Mi".

26. The data storing system according to claim 1,
wherein the plurality of drive units are those drive units connected with a SCSI bus in a library device.

27. The data storing system according to claim 26,
wherein the request threshold calculation unit is placed in a library device having the plurality of drive units.

28. A transmission control device operable to control data transmission of a plurality of drive units for writing data transmitted via a bus on a storing media and reading data from a storing media and transmitting the data via the bus in parallel, comprising:
a bus control unit operable to give a bus use right responding to a request for a bus use right made by the respective drive units according to predetermined rules;
a request threshold calculation unit operable to calculate a request threshold showing a timing at which the respective drive units request the bus use right based on the number of the drive units, a data transmission speed of the bus and either a data reading speed or a data writing speed of the respective drive units; and
a request threshold notification unit operable to notify the respective drive units of the calculated request threshold.

29. A transmission control method for controlling data transmission of a plurality of drive units for writing data transmitted via a bus on a storing media and reading data from a storing media and transmitting the data via the bus in parallel, comprising:
a bus control step of giving a bus use right responding to a request for a bus use right made by the respective drive units according to predetermined rules;
a request threshold calculation step of calculating a request threshold showing a timing at which the respective drive units request the bus use right based on the number of the drive units, a data transmission speed of the bus and either a data reading speed or a data writing speed of the respective drive units; and
a request threshold notification step of notifying the respective drive units of the calculated request threshold.

30. A transmission control program stored in a computer readable medium for controlling data transmission of a plurality of drive units for writing data transmitted via a bus on a storing media and reading data from a storing media and transmitting the data via the bus in parallel, comprising:
a bus control step of giving a bus use right responding to a request for a bus use right made by the respective drive units according to predetermined rules;
a request threshold calculation step of calculating a request threshold showing a timing at which the respective drive units request the bus use right based on the number of the drive units, a data transmission speed of the bus and either a data reading speed or a data writing speed of the respective drive units; and a request threshold notification step of notifying the respective drive units of the calculated request threshold.

31. A computer-readable storing medium that stores a program for having a computer execute the following steps:

a bus control step of giving a bus use right responding to a request for a bus use right made by the respective drive units according to predetermined rules;

a request threshold calculation step of calculating a request threshold showing a timing at which the respective drive units requesting the bus use right based on the number of the drive units, a data transmission speed of the bus and either a data reading speed or a data writing speed of the respective drive units; and a request threshold notification unit operable to notify the respective drive units of the calculated request threshold.

* * * * *